(12) United States Patent
Sun et al.

(10) Patent No.: US 9,733,758 B2
(45) Date of Patent: Aug. 15, 2017

(54) ARRAY SUBSTRATE, TOUCH DISPLAY DEVICE, AND DRIVING METHOD OF THE TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Ying Sun, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 122 days.

(21) Appl. No.: 14/942,953

(22) Filed: Nov. 16, 2015

(65) Prior Publication Data

US 2016/0188087 A1    Jun. 30, 2016

(30) Foreign Application Priority Data

Dec. 31, 2014    (CN) .......................... 2014 1 0852749

(51) Int. Cl.
*G06F 3/041*    (2006.01)
*G06F 3/044*    (2006.01)
*G06F 3/047*    (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 2012/0044166 A1* | 2/2012 | Mizuhashi | ............ | G06F 3/0412 345/173 |
| 2012/0044167 A1* | 2/2012 | Nakanishi | ............ | G06F 3/0412 345/173 |
| 2014/0049512 A1* | 2/2014 | Yang | ..................... | G06F 3/0416 345/174 |
| 2015/0277651 A1* | 10/2015 | Zhang | ................... | G06F 3/0416 345/173 |
| 2016/0259455 A1* | 9/2016 | Li | ......................... | G06F 3/0412 |

FOREIGN PATENT DOCUMENTS

| | | |
|---|---|---|
| CN | 101281725 B | 12/2011 |
| CN | 102460558 A | 5/2012 |
| CN | 103279214 A | 9/2013 |
| CN | 103310748 A | 9/2013 |

\* cited by examiner

*Primary Examiner* — Carolyn R Edwards
*Assistant Examiner* — Krishna Neupane
(74) *Attorney, Agent, or Firm* — Faegre Baker Daniels LLP

(57) ABSTRACT

An array substrate, a touch display device and a driving method of the touch display device. The gate driving circuits and the touch driving circuits electrically connected with the gate driving circuits are both disposed in the array substrate, and the secondary trigger signals outputted from the shift registers of the gate driving circuit function as the strobe signals of the touch selection outputting units from the touch driving circuits, respectively.

17 Claims, 14 Drawing Sheets

64 62   65

ARRAY SUBSTRATE, TOUCH DISPLAY DEVICE, AND DRIVING METHOD OF THE TOUCH DISPLAY DEVICE

CROSS-REFERENCE TO RELATED APPLICATION

This application claims priority to Chinese Application No. 201410852749.9, filed Dec. 31, 2014, which is herein incorporated by reference in its entirety.

TECHNICAL FIELD

The present disclosure relates to the field of display technologies and, in particular, to an array substrate, a touch display device and a driving method of the touch display device.

BACKGROUND

With the development of modern electronic technologies, components are provided in a display device to implement desired functions, such as an electromagnetic touch sensing function, to provide a user with convenience in use.

Touch driving electrodes are used in the display device in the related art in order to implement a capacitive touch sensing function. However, a touch driving circuit configured for providing touch driving signals for the touch driving electrodes is rather complex, so that it is difficult for a display device with the touch driving circuit to have a narrow frame. Additionally, due to its numerous signal inputting terminals, the touch driving circuit needs many output signals from an Integrated Circuit (IC), thereby increasing the cost of the IC.

SUMMARY

In view of the above, embodiments of the disclosure provide an array substrate, a touch display device and a driving method of the touch display device, to solve technical problems in the related art that the touch driving circuit causes the display device to have a non-narrow frame and the cost of the IC being increased.

In a first example, embodiments of the disclosure provide an array substrate comprising a display region and a peripheral region surrounding the display region, where, the display region comprises N rows of scanning lines and N is a positive integer larger than 1, and the peripheral region comprises a gate driving circuit and a touch driving circuit. The gate driving circuit comprises N stages of shift registers, wherein, the stages of shift registers configured to provide scanning signals for odd rows of scanning lines are electrically connected in series with each other to form a first gate driving circuit and further disposed at one side of the peripheral region, the stages of shift registers configured to provide scanning signals for even rows of scanning lines are electrically connected in series with each other to form a second gate driving circuit and further disposed at the other side of the peripheral region, and wherein, each stage of shift register comprises a trigger signal inputting terminal and a secondary trigger signal outputting terminal, and for two adjacent stages of shift registers electrically connected in series from the N stages of shift registers, a secondary trigger signal outputting terminal of the preceding stage of shift register from the two adjacent stages of shift registers is electrically connected with a trigger signal inputting terminal of the next stage of shift register from the two adjacent stages of shift registers. The touch driving circuit comprises a first touch driving circuit and a second touch driving circuit. The first touch driving circuit comprises M1 stages of first touch selection outputting units configured to generate first touch driving signals, and the second touch driving circuit comprises M2 stages of second touch selection outputting units configured to generate second touch driving signals, where M1 and M2 both are positive integers smaller than or equal to [N/2]. Each stage of first touch selection outputting units comprises a first strobe signal inputting terminal, and each stage of second touch selection outputting units comprises a second strobe signal inputting terminal. The first strobe signal inputting terminals of the stages of first touch selection outputting units from the first touch driving circuit are respectively electrically connected with the secondary trigger signal outputting terminals of the corresponding stages of shift registers from the first gate driving circuit, and the second strobe signal inputting terminals of the stages of second touch selection outputting units from the second touch driving circuit are respectively electrically connected with the secondary trigger signal outputting terminals of the corresponding stages of shift registers from the second gate driving circuit.

In a second example, embodiments of the disclosure further provide a touch display device, comprising an array substrate, a color filter substrate disposed opposite to the array substrate and a liquid crystal layer between the array substrate and the color filter substrate, wherein, the array substrate is the array substrate in the first example.

In a third example, embodiments of the disclosure further provide a driving method of the touch display device. The touch display device comprising a plurality of first groups of scanning lines, a plurality of second groups of scanning lines, a plurality of stages of shift registers, a plurality of stages of first touch selection outputting units and a plurality of stages of second touch selection outputting units, wherein, each of the first groups of scanning lines comprises a plurality of odd rows of scanning lines, each of the second groups of scanning lines comprises a plurality of even rows of scanning lines, each stage of shift register generates a scanning signal for scanning a scanning line and a secondary trigger signal for driving the following stage of shift register, each stage of first touch selection outputting unit is electrically connected with the secondary trigger signal outputting terminal of the shift register corresponding to the last scanning line of each of first groups of scanning lines, and each stage of second touch selection outputting unit is electrically connected with the secondary trigger signal outputting terminal of the shift register corresponding to the last scanning line of each of the second groups of scanning lines, wherein, the driving method comprises:

applying scanning signals to the scanning lines from each of the first groups of scanning lines sequentially and scanning the scanning lines line by line, within a first half frame of display scanning; driving the corresponding first touch selection outputting unit by the secondary trigger signal generated by the shift register corresponding to the last scanning line from each of the first groups of scanning lines, and generating a first touch driving signal within a scanning time interval between two adjacent first groups of scanning lines;

applying scanning signals to the scanning lines from each of the second groups of scanning lines sequentially and scanning the scanning lines line by line, within a second half frame of display scanning; and driving the corresponding second touch selection outputting unit by the secondary trigger signal generated by the shift register corresponding to the last scanning line from each of the second groups of scanning lines, and generating a second touch driving signal within a scanning time interval between two adjacent second groups of scanning lines.

With the array substrate, the touch display device and the driving method of the touch display device provided by embodiments of the disclosure, the gate driving circuits and the touch driving circuits electrically connected with the gate driving circuits are both disposed in the array substrate, and the secondary trigger signals outputted from the shift registers of the gate driving circuit function as the strobe signals of the touch selection outputting units from the touch driving circuits, respectively. Accordingly, the touch driving circuits need not dispose a scanning unit to provide the strobe signals for the touch selection outputting units, such that the touch driving circuits can be rather simple, and not only can easily implement the narrow frame of touch display device, but also can reduce the number of the output signals of the IC and hence decrease the IC's cost.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description made to nonrestrictive embodiments in the accompanying drawings below, in which.

Figure 1A:
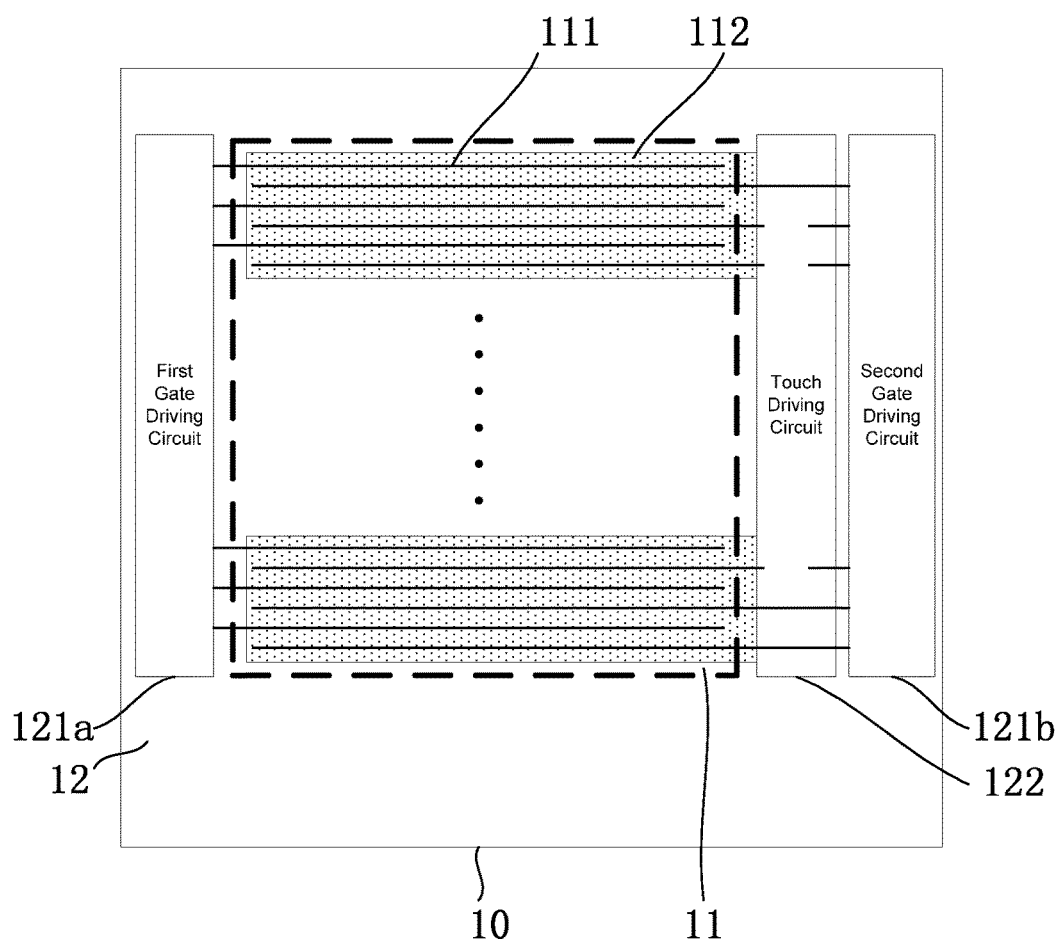
FIG. 1A is a schematic diagram of the structure of an array substrate in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further illustrated in detail below in conjunction with the accompanying drawings and embodiments. It may be understood that specific embodiments described herein are merely for explaining the disclosure rather than limiting the disclosure. Additionally, it is noted that partial contents associated with the disclosure rather than all contents are illustrated in the accompanying drawings for ease of description.

In the related art, in order to implement a capacitive touch sensing function, touch sensing electrodes can usually be disposed at one side of a color filter substrate away from an array substrate, and common electrodes provided in the array substrate are multiplexed as touch driving electrodes, i.e. the common electrodes are configured to receive common voltage signals in a display state, and the common electrodes function as touch driving electrodes in a touch state to receive touch driving signals.

FIG. 1A is a schematic diagram of the structure of an array substrate 10 in the related art. As shown in FIG. 1A, the array substrate 10 includes a display region 11 and a peripheral region 12 surrounding the display region 11, where, the display region 11 includes a plurality of rows of scanning lines 111 and a plurality of strip common electrodes 112, and the commons electrodes 112 are multiplexed as touch driving electrodes; the peripheral region 12 includes a first gate driving circuit 121a, a second gate driving circuit 121b disposed opposite to the first gate driving circuit 121a, and a touch driving circuit 122 disposed at the same side as the second gate driving circuit 121b, where, the first gate driving circuit 121a is configured to provide scanning signals for odd rows of scanning lines 111, the second gate driving circuit 121b is configured to provide scanning signals for even rows of scanning lines 111, the touch driving circuit 122 is configured to provide touch driving signals for the common electrodes 112 functioned as the touch driving electrodes in the touch state and provide common voltage signals for the common electrodes 112 in the display state, and the touch driving circuit 122 is independent of the first gate driving circuit 121a and the second gate driving circuit 121b in the FIG. 1A.

Figure 1B:
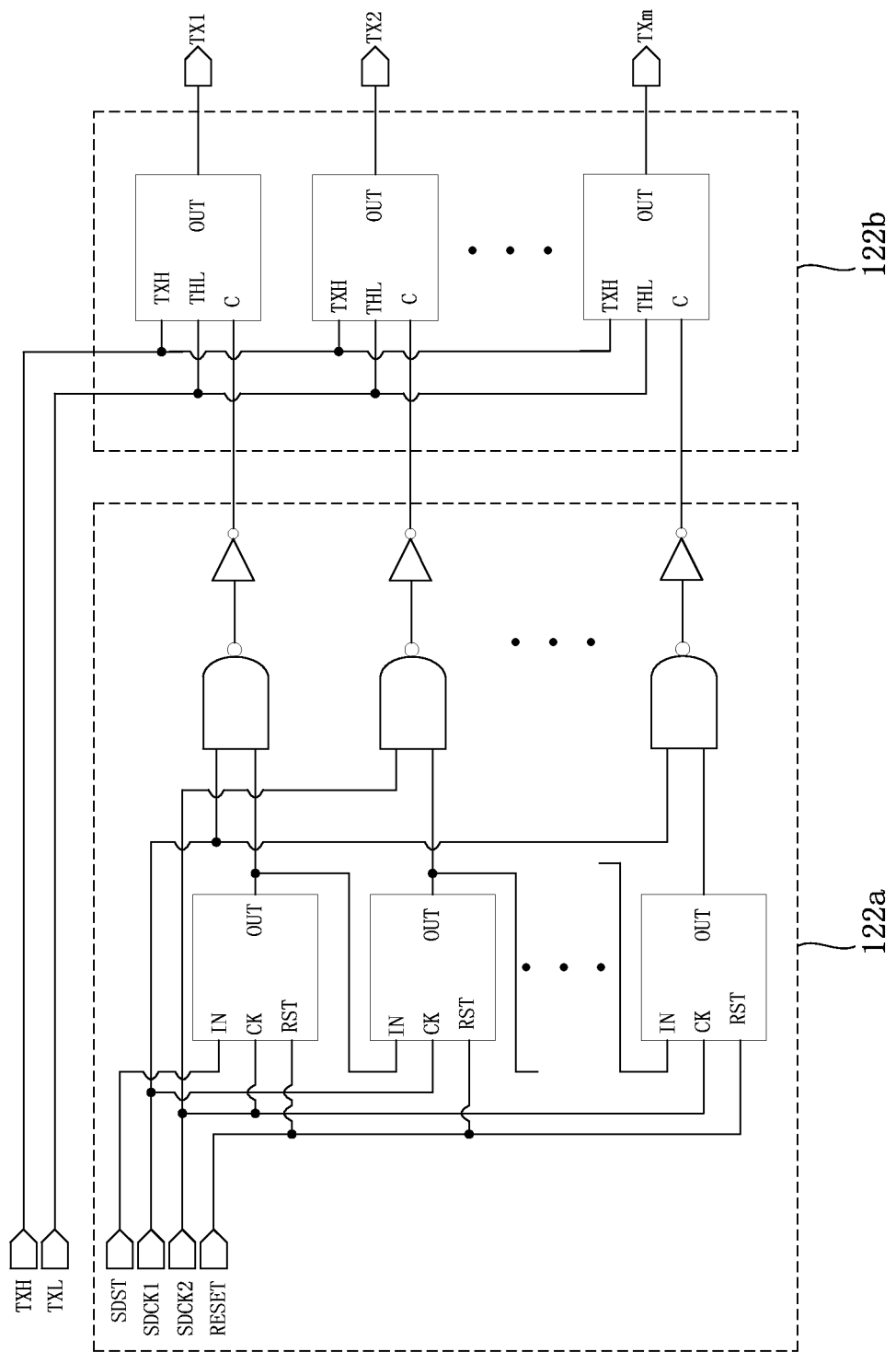
FIG. 1B is a schematic diagram of the structure of a touch driving circuit in the related art.

FIG. 1B is a schematic diagram of the structure of the touch driving circuit 122 in the related art. As shown in FIG. 1B, the touch driving circuit 122 in the FIG. 1A includes a scanning unit 122a and a touch selection outputting unit 122b, where, the scanning unit 122a is configured to provide strobe signals for the touch selection outputting unit 122b to enable the touch selection outputting unit 122b to generate touch driving signals corresponding to the strobe signals. In FIG. 1B, SDST represents a trigger signal inputting terminal, SDCK1 represents a first clock signal inputting terminal, SDCK2 represents a second clock signal inputting terminal, RESET represents a reset signal inputting terminal, TXH represents a first signal inputting terminal, TXL represents a second signal inputting terminal and TX1~TXm represent various touch driving signal outputting terminals, respectively.

As known from FIG. 1B, the touch driving circuit 122 in the related art is rather complex, so that a large space of a frame region of the array substrate is occupied, thereby hardly achieving a narrow frame of the display device with the array substrate. Additionally, due to the large number of signal inputting terminals of the touch driving circuit 122, in particularly the large number of signal inputting terminals of the scanning unit 122a, the touch driving circuit 122 needs a large number of output signals from the IC, thereby increasing the IC's cost.

In view of the above, the disclosure provides the following technical solutions.

Figure 2:
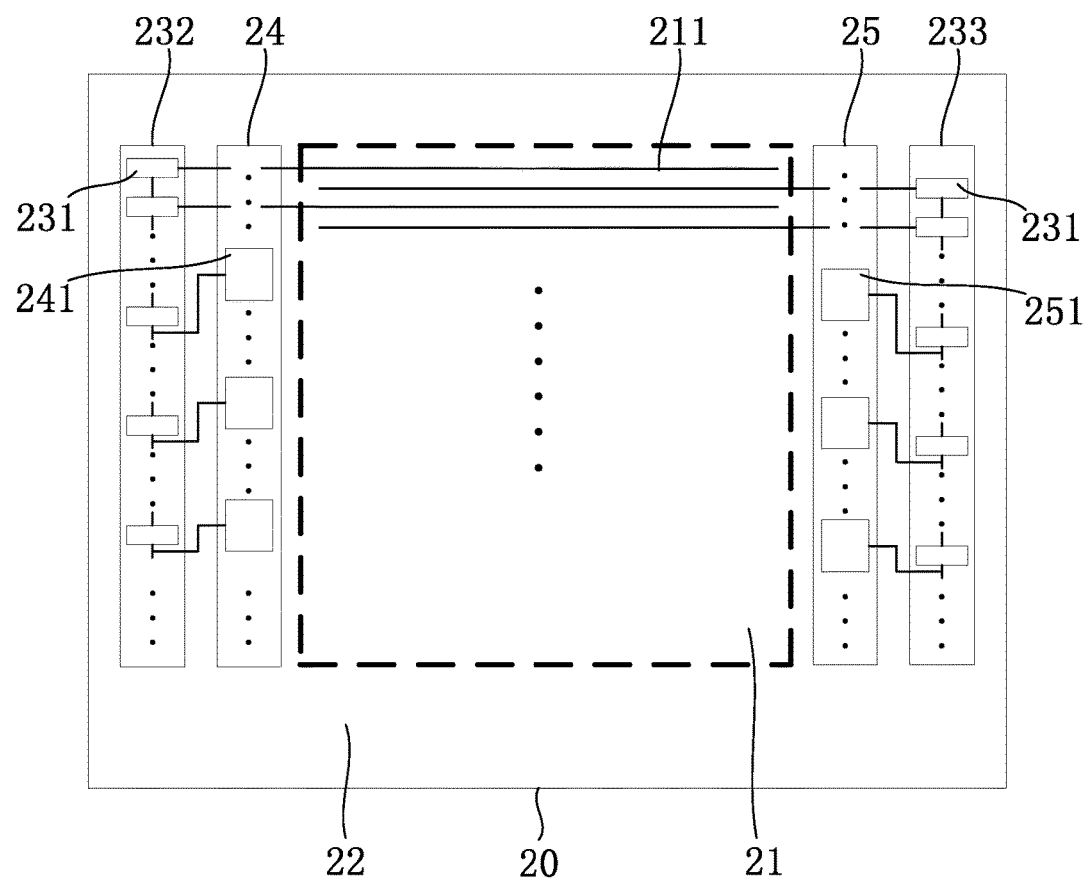
FIG. 2 is a schematic diagram of the structure of the gate controlling unit, according to embodiments of the disclosure.

Embodiments of the disclosure provide an array substrate. FIG. 2 is a schematic diagram of the structure of an array substrate, according to embodiments of the disclosure. As shown in FIG. 2, the array substrate 20 includes: a display region 21 and a peripheral region surrounding the display region 22, where, the display region 21 includes N rows of scanning lines 211, where N is a positive integer larger than 1; and the peripheral region 22 includes: a gate driving circuit and a touch driving circuit, where, the gate driving circuit includes N stages of shift registers 231, where, the stages of shift registers 231 configured to provide scanning signals for odd rows of scanning lines 211 are electrically connected in series with each other to form a first gate driving circuit 232 and further disposed at one side of the peripheral region 22 (e.g. a left side of the peripheral region 22 in FIG. 2), the stages of shift registers 231 configured to provide scanning signals for even rows of scanning lines 211 are electrically connected in series with each other to form a second gate driving circuit 233 and further disposed at the other side of the peripheral region 22 (e.g. a right side of the peripheral region 22 in FIG. 2), where, each stage of shift register 231 includes a trigger signal inputting terminal and a secondary trigger signal outputting terminal, and for two adjacent stages of shift registers 231 electrically connected in series from the N stages of shift registers 231, a secondary trigger signal outputting terminal of the preceding stage of shift register 231 from the two adjacent stages of shift registers is electrically connected with a trigger signal inputting terminal of the next stage of shift register 231 from the two adjacent stages of shift registers; the touch driving circuit includes a first touch driving circuit 24 and a second touch driving circuit 25, where, the first touch driving circuit 24 includes M1 stages of first touch selection outputting units 241 configured to generate first touch driving signals, the second touch driving circuit 25 includes M2 stages of second touch selection outputting units 251 configured to generate second touch driving signals, M1 and M2 both are positive integers smaller than or equal to [N/2], each stage of first touch selection outputting unit 241 includes a first strobe signal inputting terminal, and each stage of second touch selection outputting unit 251 includes a second strobe signal inputting terminal; and the first strobe signal inputting terminals of the stages of first touch selection outputting units 241 from the first touch driving circuit 24 are respectively electrically connected with the secondary trigger signal outputting terminals of the corresponding stages of shift registers 231 from the first gate driving circuit 232, and the second strobe signal inputting terminals of the stages of second touch selection outputting units 251 from the second touch driving circuit 25 are respectively electrically connected with the secondary trigger signal outputting terminals of the corresponding stages of shift registers 231 from the second gate driving circuit 233.

The peripheral region 22 of the array substrate 20 is provided with the first gate driving circuit 232 and the second gate driving circuit 233, and both the first gate driving circuit 232 and the second gate driving circuit 233 are disposed at two opposite sides of the peripheral region 22, respectively, and thus the array substrate 20 is a structure in a two side scanning manner. The peripheral region 22 of the array substrate 20 is further provided with the first touch driving circuit 24 and the second touch driving circuit 25, where, the first touch driving circuit 24 and the first gate driving circuit 232 are disposed at one side of the peripheral region 22, and the first touch driving circuit 24 is disposed relatively close to the display region 21 and the first gate driving circuit 232 is disposed relatively away from the display region 21; the second touch driving circuit 25 and the second gate driving circuit 233 are disposed at the other side of the peripheral region 22, and the second touch driving circuit 25 is disposed relatively close to the display region 21 and the second gate driving circuit 233 is disposed relatively away from the display region 21. The first touch driving circuit 24 includes M1 stages of first touch selection outputting units 241, and the second touch driving circuit 25 includes M2 stages of second touch selection outputting units 251, where, the first strobe signal inputting terminals of the stages of first touch selection outputting units 241 from the first touch driving circuit 24 are respectively electrically connected with the secondary trigger signal outputting terminals of the corresponding stages of shift registers 231 from the first gate driving circuit 232, and the second strobe signal inputting terminals of the stages of second touch selection outputting units 251 from the second touch driving circuit 25 are respectively electrically connected with the secondary trigger signal outputting terminals of the corresponding stages of shift registers 231 from the second gate driving circuit 233. In comparison with the case where the gate driving circuit is independent of the touch driving circuit and the scanning units in the touch driving circuit provide the strobe signals for corresponding touch selection outputting units, the technical solutions provided by the present disclosure provide the gate driving circuit electrically connected with the touch driving circuit, and the secondary trigger signals outputted from the shift registers in the gate driving circuit function as the strobe signals for the corresponding touch selection outputting units in the touch driving circuit, such that the touch driving circuit does not need the additional scanning units to provide the strobe signals for the touch selection outputting units and thus can be rather simple in configuration, thereby easily achieving the narrow frame of the array substrate; additionally, since the scanning units have many signal inputting terminals and hence the IC has many output signals, the technical solution provided by the disclosure can further reduce the output signals from the IC, thereby decreasing the IC's cost.

Figure 3A:
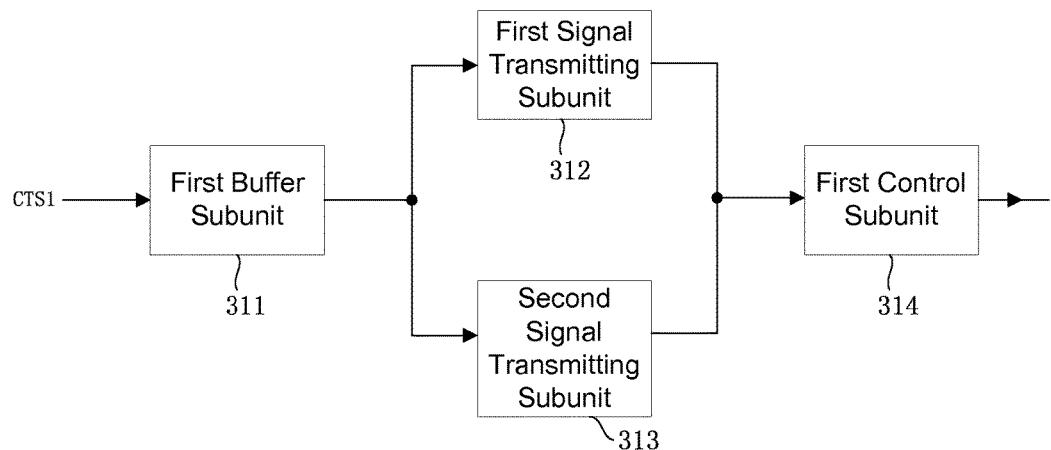
FIG. 3A is a circuit diagram of a gate controlling unit, according to embodiments of the disclosure.

In embodiments of the disclosure, as shown in FIG. 3A, each stage of first touch selection outputting units 241 can further include: a first buffer subunit 311, a first signal transmitting subunit 312, a second signal transmitting subunit 313 and a first control subunit 314, where, the first buffer subunit 311 is configured to buffer the first strobe signal received from a first strobe signal inputting terminal CTS1; the first signal transmitting subunit 312 is configured to transmit a first signal according to the first strobe signal buffered by the first buffer subunit 311; the second signal transmitting subunit 313 is configured to transmit a second signal according to the first strobe signal buffered by the first buffer subunit 311; and the first control subunit 314 is configured to control whether the first signal or the second signal is outputted from the first touch selection outputting unit 241.

It is noted that the first strobe signal received from a first strobe signal inputting terminal CTS1 is the secondary trigger signal outputted from the secondary trigger signal outputting terminal of the shift register of the first gate driving circuit 232 electrically connected with the first strobe signal inputting terminal CTS1. In other words, the second trigger signals generated by the first gate driving circuit 232 function as the corresponding first strobe signals of the first touch driving circuit 24.

Figure 3B:
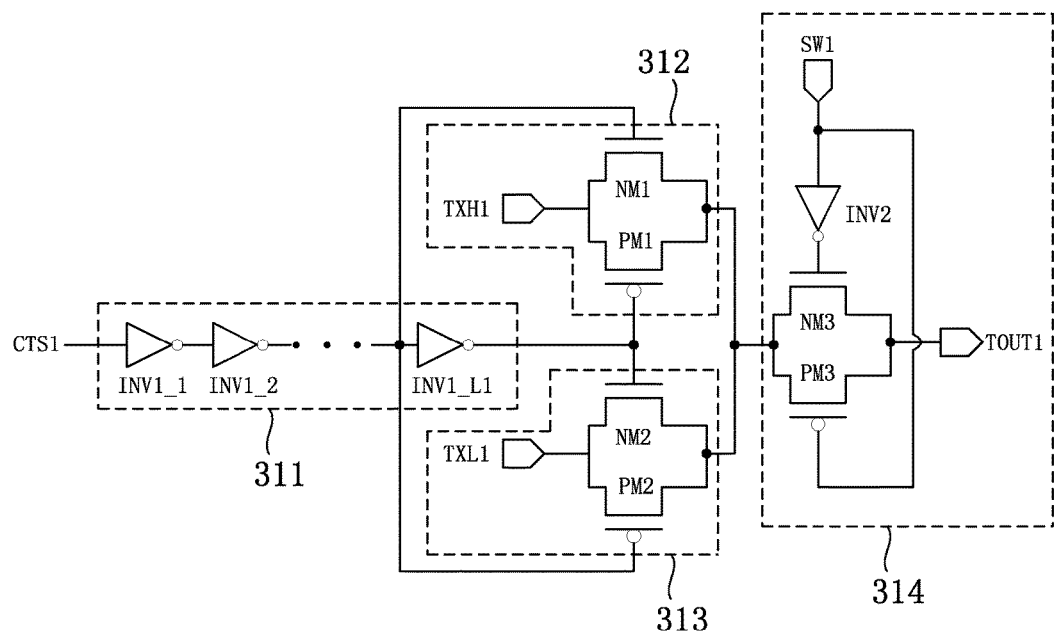
FIG. 3B is a timing diagram of various signals of the gate controlling unit in FIG. 3A.

In embodiments of the disclosure, as shown in FIG. 3B, in the first touch selection outputting unit 241, the first buffer subunit 311 can include L1 first inverters including the first first inverter to the L1-th first inverter (INV1_1 to INV1_L1) electrically connected in series with each other, an input terminal of the first first inverter INV1_1 is electrically connected with the first strobe signal inputting terminal CTS1, and the L1-th first inverter INV1_L1 is electrically connected with the first signal transmitting subunit 312 and the second signal transmitting subunit 313, where, L1 is a positive integer; the first signal transmitting subunit 312 can include a first N-channel Metal Oxide Semiconductor (NMOS) transistor NM1, a first P-channel Metal Oxide Semiconductor (PMOS) transistor PM1 and a first signal inputting terminal TXH1, where, a gate electrode of the first NMOS transistor NM1 is electrically connected with an input terminal of the L1-th first inverter INV1_L1, and a gate electrode of the first PMOS transistor PM1 is electrically connected with an output terminal of the L1-th first inverter INV1_L1; a source electrode of the first NMOS transistor NM1 and a drain electrode of the first PMOS transistor PM1 are electrically connected with each other and further electrically connected with the first signal inputting terminal TXH1, and a drain electrode of the first NMOS transistor NM1 and a source electrode of the first PMOS transistor PM1 are electrically connected with each other and further electrically connected with the first control subunit 314; the second signal transmitting subunit 313 can include a second NMOS transistor NM2, a second PMOS transistor PM2 and a second signal inputting terminal TXL1, where, a gate electrode of the second PMOS transistor PM2 is electrically connected with an input terminal of the L1-th first inverter INV1_L1, and a gate electrode of the second NMOS transistor NM2 is electrically connected with an output terminal of the L1-th first inverter INV1_L1; a source electrode of the second NMOS transistor NM2 and a drain electrode of the second PMOS transistor PM2 are electrically connected with each other and further electrically connected with the second signal inputting terminal TXL1, and a drain electrode of the second NMOS transistor NM2 and a source electrode of the second PMOS transistor PM2 are electrically connected with each other and further electrically connected with the first control subunit 314; and the first control subunit 314 can include: a second inverter INV2, a third NMOS transistor NM3, a third PMOS transistor PM3, a first control signal inputting terminal SW1 and a first touch driving signal outputting terminal TOUT1, where, an input terminal of the second inverter INV2 is electrically connected with the first control signal inputting terminal SW1 and a gate electrode of the third PMOS transistor PM3, respectively, an output terminal of the second inverter INV2 is electrically connected with a gate electrode of the third NMOS transistor NM3, a source electrode of the third NMOS transistor NM3 and a drain electrode of the third PMOS transistor PM3 are electrically connected with each other and further electrically connected with the drain electrode of the first NMOS transistor NM1 and the source electrode of the first PMOS transistor PM1 and the drain electrode of the second NMOS transistor NM2 and the source electrode of the second PMOS transistor PM2, and a drain electrode of the third NMOS transistor NM3 and a source electrode of the third PMOS transistor PM3 are electrically connected with each other and further electrically connected with the first touch driving signal outputting terminal TOUT1.

Figure 3C:
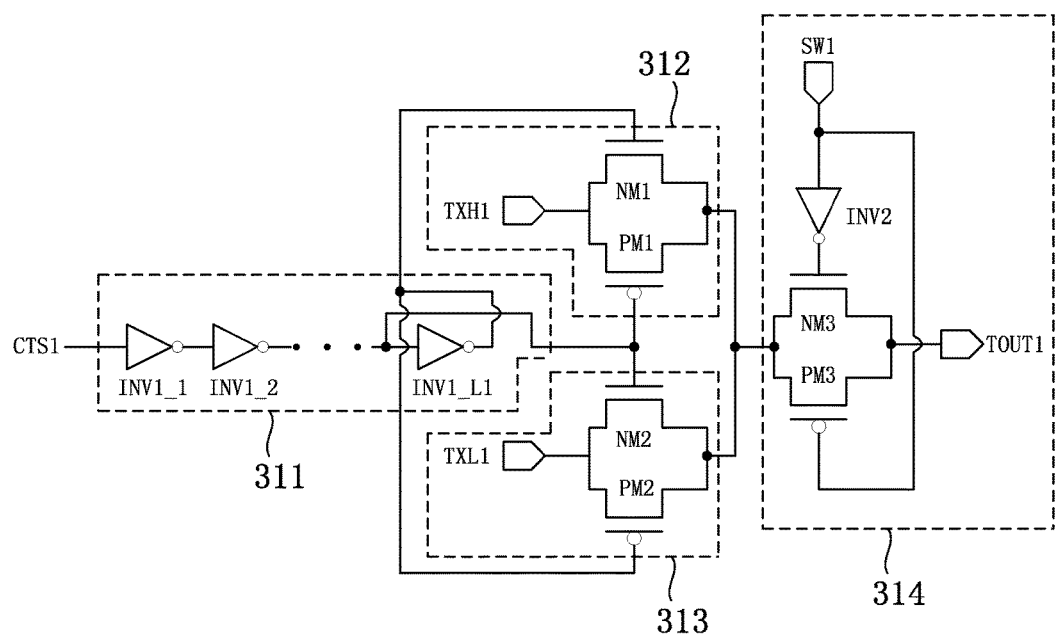
FIG. 3C is a circuit diagram of another gate controlling unit, according to embodiments of the disclosure.

In FIG. 3B, L1 is an odd number. However, L1 may also be an even number, as shown in FIG. 3C, it is different from FIG. 3B in that a gate electrode of the first PMOS transistor PM1 is electrically connected with an input terminal of the L1-th first inverter INV1_L1, and a gate electrode of the first NMOS transistor NM1 is electrically connected with an output terminal of the L1-th first inverter INV1_L1; a gate electrode of the second NMOS transistor NM2 is electrically connected with an input terminal of the L1-th first inverter INV1_L1, and a gate electrode of the second PMOS transistor PM2 is electrically connected with an output terminal of the L1-th first inverter INV1_L1.

Since the operating principle of the first touch selection outputting unit shown in FIG. 3B is the same as that shown in FIG. 3C, the operating principle of the first touch selection outputting unit shown in FIG. 3B is illustrated below, for example.

Figure 3D:
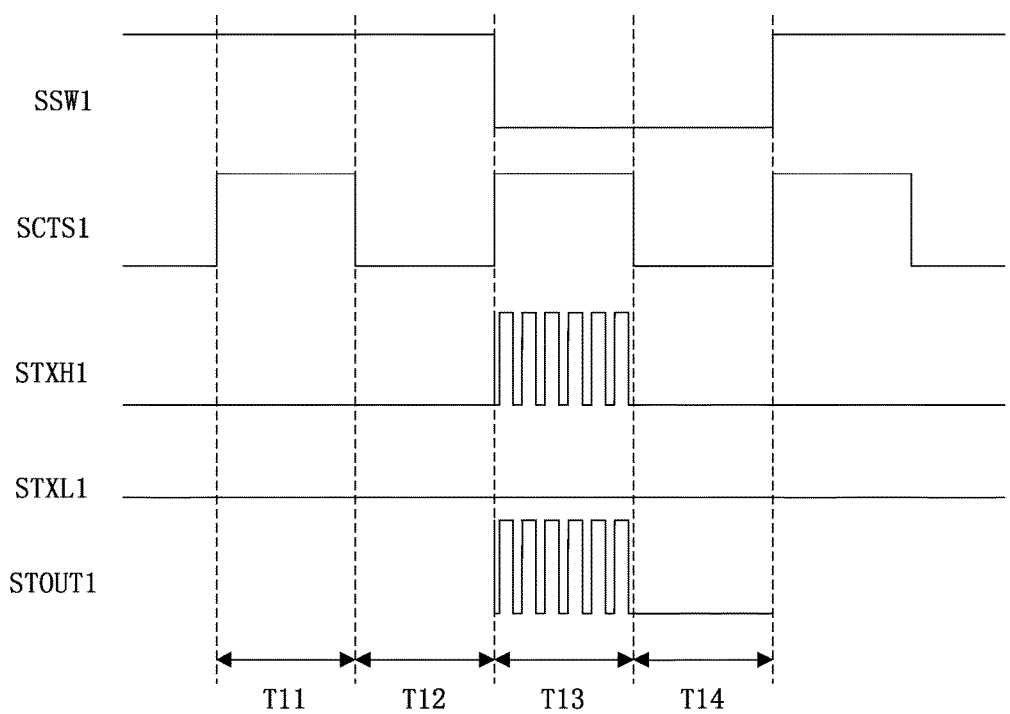
FIG. 3D is a circuit diagram of a further gate controlling unit, according to embodiments of the disclosure.

FIG. 3D is a timing diagram of the input signals from various input terminals and the output signals from various output terminals in FIG. 3B. In FIG. 3D, SSW1 represents the first control signal received from the first control signal inputting terminal SW1; SCTS1 represents the first strobe signal received from the first strobe signal inputting terminal CTS1; STXH1 represents the first signal received from the first signal inputting terminal TXH1; STXL1 represents the second signal received from the second signal inputting terminal TXL1; STOUT1 represents the first touch driving signal outputted from the first touch driving signal outputting terminal TOUT1, where, at a time of outputting the first touch driving signal from the first touch selection outputting unit 241, the first signal is a pulse signal including a plurality of pulses, and at other times, the first signal is a low level signal. The second signal is still a low level signal. The operating principle of the first touch selection outputting unit 241 shown in FIG. 3B is further illustrated below in combination with FIG. 3D.

As shown in FIG. 3B and FIG. 3D, in a stage T11, the first strobe signal SCTS1 is at a high level, and the first control signal SSW1 is at a high level, so that the first NMOS transistor NM1 and the first PMOS transistor PM1 are turned on, and the second NMOS transistor NM2 and the second PMOS transistor PM2 are turned off, the first signal STXH1 is transmitted to the first control subunit 314 via the turned-on first NMOS transistor NM1 and the turned-on first PMOS transistor PM1. Since the first control signal SSW1 is at a high level, the third NMOS transistor NM3 and the third PMOS transistor PM3 are turned off, so that the first signal STXH1 cannot be transmitted to the first touch driving signal outputting terminal TOUT1, and thus in this stage, the first touch driving signal outputting terminal TOUT1 is in a high impedance state (i.e. in an idle state).

In a stage T12, the first strobe signal SCTS1 is at a low level, and the first control signal SSW1 is at a high level, so that the first NMOS transistor NM1 and the first PMOS transistor PM1 are turned off, and the second NMOS transistor NM2 and the second PMOS transistor PM2 both are turned on, the second signal STXL1 is transmitted to the first control subunit 314 via the turned-on second NMOS transistor NM2 and the turned-on second PMOS transistor PM2; since the first control signal SSW1 is at a high level, the third NMOS transistor NM3 and the third PMOS transistor PM3 are turned off, and thus the second signal STXL1 cannot be transmitted to the first touch driving signal outputting terminal TOUT1, and thus in this stage, the first touch driving signal outputting terminal TOUT1 is in a high impedance state (i.e. in an idle state).

In a stage T13, the first strobe signal SCTS1 is at a high level, and the first control signal SSW1 is at a low level, so that the first NMOS transistor NM1 and the first PMOS transistor PM1 are turned on, and the second NMOS transistor NM2 and the second PMOS transistor PM2 are turned off, the first signal STXH1 is transmitted to the first control subunit 314 via the turned-on first NMOS transistor NM1 and the turned-on first PMOS transistor PM1. Since the first control signal SSW1 is at a low level, the third NMOS transistor NM3 and the third PMOS transistor PM3 are turned on, so that the first signal STXH1 can be transmitted to the first touch driving signal outputting terminal TOUT1 via the turned-on third NMOS transistor NM3 and the turned-on third PMOS transistor PM3, and the first signal is a pulse signal in this stage, and accordingly the first touch driving signal outputted from the first touch driving signal outputting terminal TOUT1 is also a pulse signal including a plurality of pluses, i.e. the first touch driving signal is an active first touch driving signal in this stage.

In a stage T14, the first strobe signal SCTS1 is at a low level, and the first control signal SSW1 is at a low level, so that the first NMOS transistor NM1 and the first PMOS transistor PM1 are turned off, and the second NMOS transistor NM2 and the second PMOS transistor PM2 both are turned on, the second signal STXL1 is transmitted to the first control subunit 314 via the turned-on second NMOS transistor NM2 and the turned-on second PMOS transistor PM2; since the first control signal SSW1 is at a low level, the third NMOS transistor NM3 and the third PMOS transistor PM3 are turned on, so that the second signal STXL1 can be transmitted to the first touch driving signal outputting terminal TOUT1 via the turned-on third NMOS transistor NM3 and the turned-on third PMOS transistor PM3, and accordingly the first touch driving signal outputted from the first touch driving signal outputting terminal TOUT1 is a low level signal, i.e. the first touch driving signal is an inactive first touch driving signal in this stage.

Figure 4A:
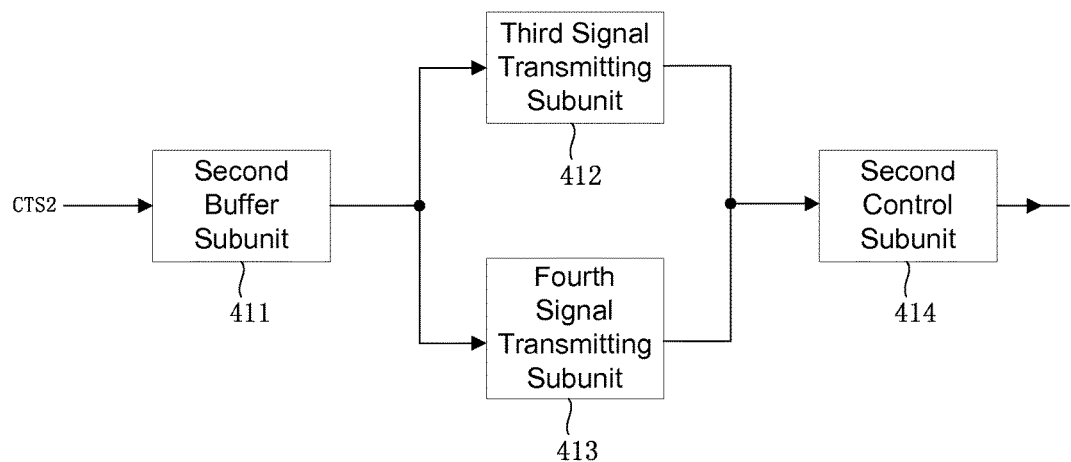
FIG. 4A is a circuit diagram of a yet another gate controlling unit, according to embodiments of the disclosure.

In embodiments of the disclosure, as shown in FIG. 4A, each stage of second touch selection outputting unit 251 further includes: a second buffer subunit 411, a third signal transmitting subunit 412, a fourth signal transmitting subunit 413 and a second control subunit 414, where, the second buffer subunit 411 is configured to buffer second strobe signal received from the second strobe signal inputting terminal CTS2; the third signal transmitting subunit 412 is configured to transmit a third signal according to the second strobe signal buffered by the second buffer subunit 411; the fourth signal transmitting subunit 413 is configured to transmit a fourth signal according to the second strobe signal buffered by the second buffer subunit 411; and the second control subunit 414 is configured to control whether the third signal or the fourth signal is outputted from the second touch selection outputting unit.

It is noted that the second strobe signal received from a second strobe signal inputting terminal CTS2 is the secondary trigger signal outputted from the secondary trigger signal outputting terminal of the shift register of the second gate driving circuit 233 electrically connected with the second strobe signal inputting terminal CTS2. In other words, the second trigger signals generated by the second gate driving circuit 233 function as the corresponding second strobe signal of the second touch driving circuit 25.

Figure 4B:
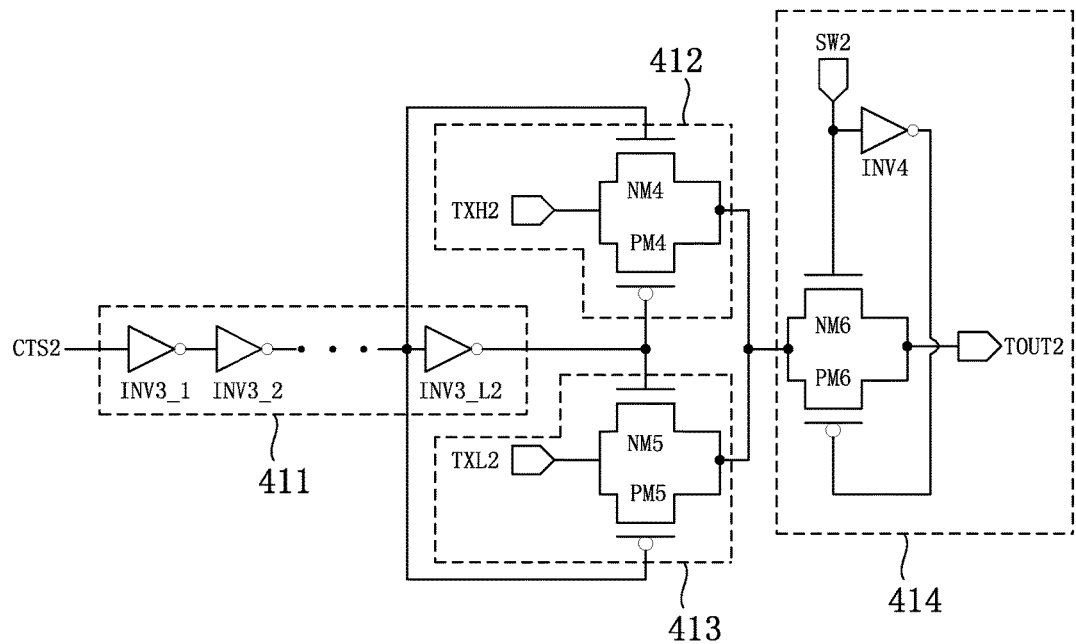
FIG. 4B is a circuit diagram of a yet another gate controlling unit, according to embodiments of the disclosure.

In embodiments of the disclosure, as shown in FIG. 4B, in the second touch selection outputting unit 251, the second buffer subunit 411 can include L2 third inverters including the first third inverter to the L2-th third inverter (INV3_1 to INV3_L2) electrically connected in series with each other, an input terminal of the first third inverter INV3_1 is electrically connected with the second strobe signal inputting terminal CTS2, and the L1-th third inverter INV3_L2 is electrically connected with the third signal transmitting subunit 412 and the fourth signal transmitting subunit 413, where, L2 is a positive integer; the third signal transmitting subunit 412 can include a fourth NMOS transistor NM4, a fourth PMOS transistor PM4 and a third signal inputting terminal TXH2, where, a gate electrode of the fourth NMOS transistor NM4 is electrically connected with an input terminal of the L2-th third inverter INV3_L2, and a gate electrode of the fourth PMOS transistor PM4 is electrically connected with an output terminal of the L2-th third inverter INV3_L2; a source electrode of the fourth NMOS transistor NM4 and a drain electrode of the fourth PMOS transistor PM4 are electrically connected with each other and further electrically connected with the third signal inputting terminal TXH2, and a drain electrode of the fourth NMOS transistor NM4 and a source electrode of the fourth PMOS transistor PM4 are electrically connected with each other and further electrically connected with the second control subunit 414; the fourth signal transmitting subunit 413 can include a fifth NMOS transistor NM5, a fifth PMOS transistor PM5 and a fourth signal inputting terminal TXL2, where, a gate electrode of the fifth PMOS transistor PM5 is electrically connected with an input terminal of the L2-th third inverter INV3_L2, and a gate electrode of the fifth NMOS transistor NM5 is electrically connected with an output terminal of the L2-th third inverter INV3_L2; a source electrode of the fifth NMOS transistor NM5 and a drain electrode of the fifth PMOS PM5 are electrically connected with each other and further electrically connected with the fourth signal inputting terminal TXL2, and a drain electrode of the fifth NMOS transistor NM5 and a source electrode of the fifth PMOS transistor PM5 are electrically connected with each other and further electrically connected with the second control subunit 414; and the second control subunit 414 can include: a fourth inverter INV4, a sixth NMOS transistor NM6, a sixth PMOS transistor PM6, a second control signal inputting terminal SW2 and a second touch driving signal outputting terminal TOUT2, where, an input terminal of the fourth inverter INV4 is electrically connected with the second control signal inputting terminal SW2 and a gate electrode of the sixth NMOS transistor NM6, respectively, an output terminal of the fourth inverter INV4 is electrically connected with a gate electrode of the sixth PMOS transistor PM6, a source electrode of the sixth NMOS transistor NM6 and a drain electrode of the sixth PMOS transistor PM6 are electrically connected with each other and further electrically connected with the drain electrode of the fourth NMOS transistor NM4 and the source electrode of the fourth PMOS transistor PM4 and the drain electrode of the fifth NMOS transistor NM5 and the source electrode of the fifth PMOS transistor PM5, and a drain electrode of the sixth NMOS transistor NM6 and a source electrode of the sixth PMOS transistor PM6 are electrically connected with each other and further electrically connected with the second touch driving signal outputting terminal TOUT2.

Figure 4C:
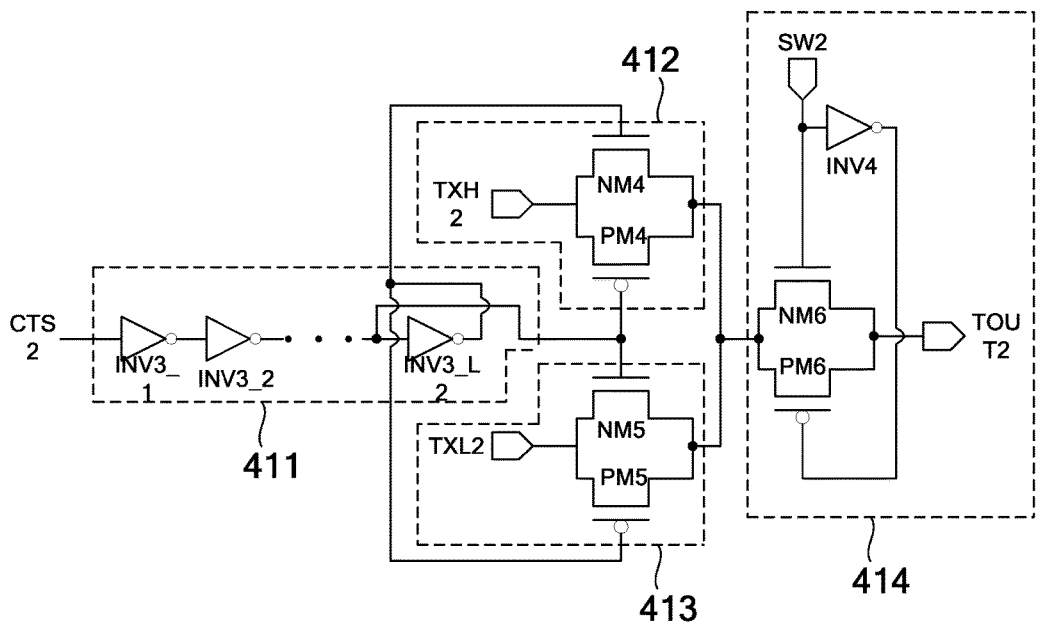
FIG. 4C is a circuit diagram of a yet another gate controlling unit, according to embodiments of the disclosure.

In FIG. 4B, L2 is an odd number. However, L2 may also be an even number, as shown in FIG. 4C, it is different from FIG. 4B in that a gate electrode of the fourth PMOS transistor PM4 is electrically connected with an input terminal of the L2-th third inverter INV3_L2, and a gate electrode of the fourth NMOS transistor NM4 is electrically connected with an output terminal of the L2-th third inverter INV3_L2; the gate electrode of the fifth NMOS transistor NM5 is electrically connected with the input terminal of the L2-th third inverter INV3_L2, and the gate electrode of the fifth PMOS transistor PM5 is electrically connected with the output terminal of the L2-th third inverter INV3_L2.

Since the operating principle of the second touch selection outputting unit shown in FIG. 4B is the same as that in FIG. 4C, the operating principle of the second touch selection outputting unit shown in FIG. 4B is illustrated below, for example.

Figure 4D:
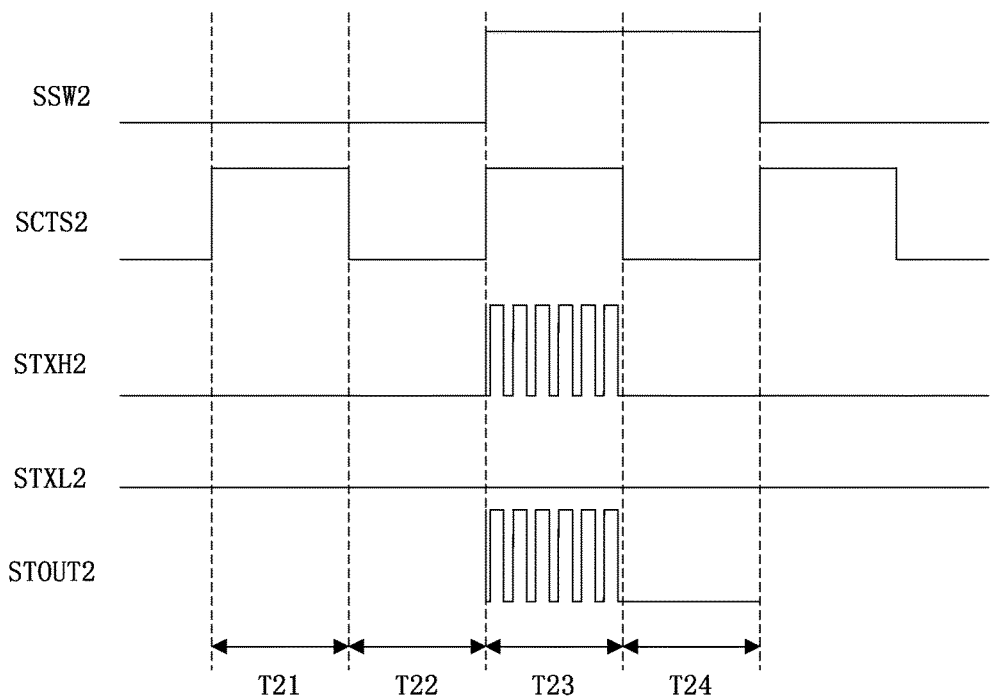
FIG. 4D is a circuit diagram of a yet another gate controlling unit, according to embodiments of the disclosure.

FIG. 4D is a timing diagram of the input signals from various input terminals and the output signals from various output terminals in FIG. 4B. In FIG. 4D, SSW2 represents the second control signal received from the second control signal inputting terminal SW2; SCTS2 represents the second strobe signal received from the second strobe signal inputting terminal CTS2; STXH2 represents the third signal received from the third signal inputting terminal TXH2; STXL2 represents the fourth signal received from the fourth signal inputting terminal TXL2; STOUT2 represents the second touch driving signal outputted from the second touch driving signal outputting terminal TOUT2, where, at a time of outputting the second touch driving signal from the second touch selection outputting unit 251, the third signal is a pulse signal including a plurality of pulses, and at other times, the third signal is a low level signal. The fourth signal is a still a low level signal. The operating principle of the second touch selection outputting unit 251 shown in FIG. 4B is further illustrated below in combination with FIG. 4D.

As shown in FIG. 4B and FIG. 4D, in a stage T21, the second strobe signal SCTS2 is at a high level, and the second control signal SSW2 is at a low level, so that the fourth NMOS transistor NM4 and the fourth PMOS transistor PM4 are turned on, and the fifth NMOS transistor NM5 and the fifth PMOS transistor PM5 are turned off, the third signal STXH2 is transmitted to the second control subunit 414 via the turned-on fourth NMOS transistor NM4 and the turned-on fourth PMOS transistor PM4; since the second control signal SSW2 is at a low level, the sixth NMOS transistor NM6 and the sixth PMOS transistor PM6 are turned off, so that the third signal STXH2 cannot be transmitted to the second touch driving signal outputting terminal TOUT2, and thus in this stage, the second touch driving signal outputting terminal TOUT2 is in a high impedance state (i.e. in an idle state).

In a stage T22, the second strobe signal SCTS2 is at a low level, and the second control signal SSW2 is at a low level, so that the fourth NMOS transistor NM4 and the fourth PMOS transistor PM4 are turned off, and the fifth NMOS transistor NM5 and the fifth PMOS transistor PM5 are turned on, the fourth signal STXL2 is transmitted to the second control subunit 414 via the turned-on fifth NMOS transistor NM5 and the turned-on fifth PMOS transistor PM5; since the second control signal SSW2 is at a low level, the sixth NMOS transistor NM6 and the sixth PMOS transistor PM6 are turned off, so that the fourth signal STXL2 cannot be transmitted to the second touch driving signal outputting terminal TOUT2, and thus in this stage, the second touch driving signal outputting terminal TOUT2 is in a high impedance state (i.e. in an idle state).

In a stage T23, the second strobe signal SCTS2 is at a high level, and the second control signal SSW2 is at a high level, so that the fourth NMOS transistor NM4 and the fourth PMOS transistor PM4 are turned on, and the fifth NMOS transistor NM5 and the fifth PMOS transistor PM5 are turned off, the third signal STXH2 is transmitted to the second control subunit 414 via the turned-on fourth NMOS transistor NM4 and the turned-on fourth PMOS transistor PM4; since the second control signal SSW2 is at a high level, the sixth NMOS transistor NM6 and the sixth PMOS transistor PM6 are turned on, so that the third signal STXH2 can be transmitted to the second touch driving signal outputting terminal TOUT2 via the turned-on sixth NMOS transistor NM6 and the turned-on sixth PMOS transistor PM6, and the third signal STXH2 is a pulse signal in the stage, and accordingly the second touch driving signal outputted from the second touch driving signal outputting terminal TOUT2 is also a pulse signal including a plurality of pluses, i.e. the second touch driving signal is an active second touch driving signal in this stage.

In a stage T24, the second strobe signal SCTS2 is at a low level, and the second control signal SSW2 is at a high level, so that the fourth NMOS transistor NM4 and the fourth PMOS transistor PM4 are turned off, and the fifth NMOS transistor NM5 and the fifth PMOS transistor PM5 are turned on, so that the fourth signal STXL2 is transmitted to the second control subunit 414 via the turned-on fifth NMOS transistor NM5 and the turned-on fifth PMOS transistor PM5; since the second control signal SSW2 is at a high level, the sixth NMOS transistor NM6 and the sixth PMOS transistor PM6 are turned on, so that the fourth signal STXL2 can be transmitted to the second touch driving signal outputting terminal TOUT2 via the turned-on sixth NMOS transistor NM6 and the turned-on sixth PMOS transistor PM6, and accordingly the second touch driving signal outputted from the second touch driving signal outputting terminal TOUT2 is a low level signal, i.e. the second touch driving signal is an inactive second touch driving signal in this stage.

Figure 5:
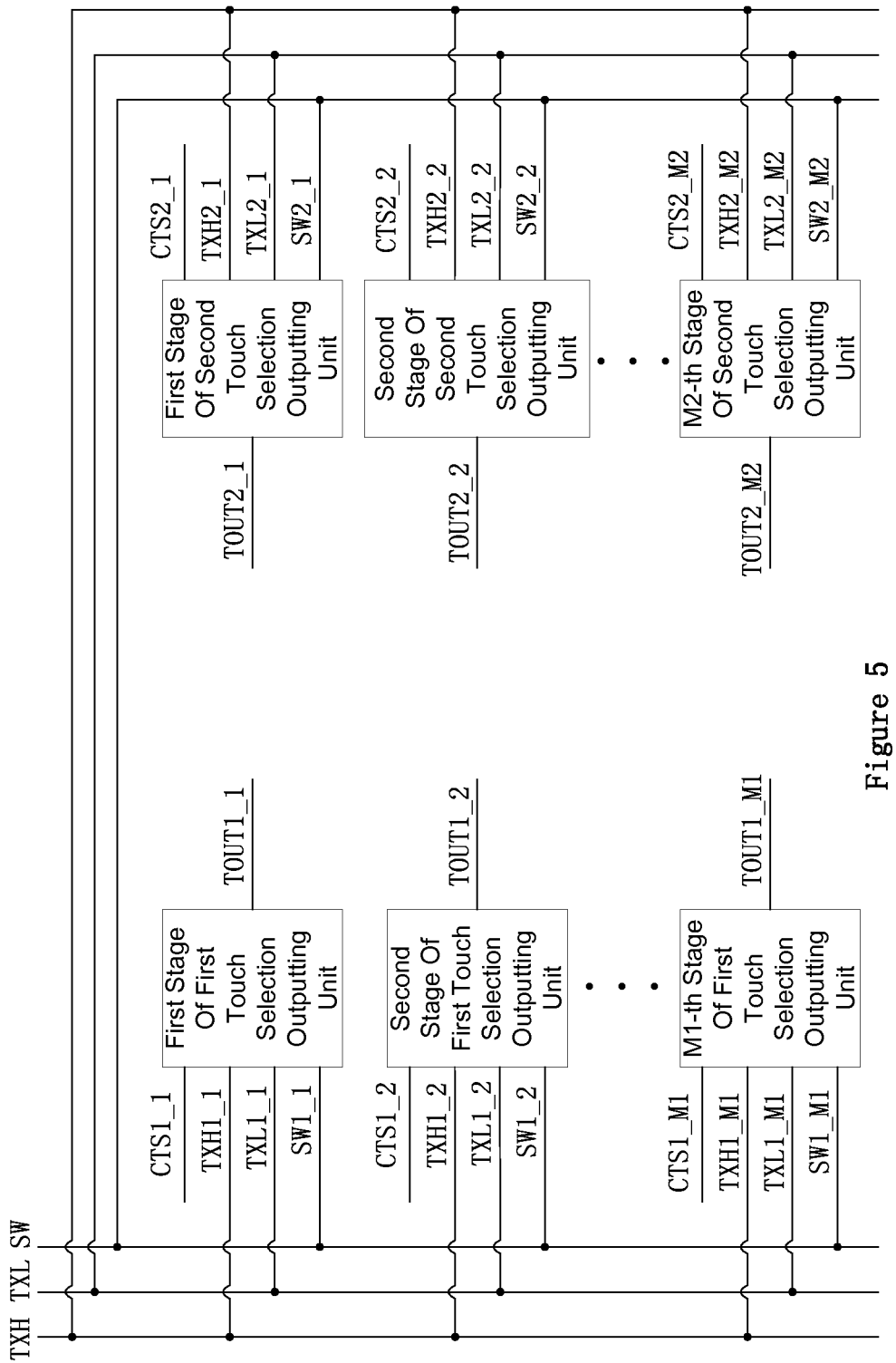
FIG. 5 is a schematic diagram of the structure of a gate controlling unit, according to embodiments of the disclosure.

In embodiments of the disclosure, as shown in FIG. 5, the touch driving circuit further includes: a first signal line TXH, a second signal line TXL and a first control signal line SW; a first signal inputting terminal (TXH1_1 to TXH1_M1) of each stage of first touch selection outputting unit 241 and a third signal inputting terminal (TXH2_1 to TXH2_M2) of each stage of second touch selection outputting unit 251 are electrically connected with the first signal line TXH, a second signal inputting terminal (TXL1_1 to TXL1_M1) of each stage of first touch selection outputting unit 241 and a fourth signal inputting terminal (TXL2_1 to TXL2_M2) of each stage of second touch selection outputting unit 251 are electrically connected with the second signal line TXL, and a first control signal inputting terminal (SW1_1 to SW1_M1) of each stage of first touch selection outputting unit 241 and a second control signal inputting terminal (SW2_1 to SW2_M2) of each stage of second touch selection outputting unit 251 are electrically connected with the first control signal line SW. In FIG. 5, TOUT1_1 to TOUT1_M1 represent the first touch driving signal outputting terminals of the stages of first touch selection outputting units 241, and TOUT2_1 to TOUT2_M1 represent the second touch driving signal outputting terminals of the stages of second touch selection outputting units 251. The first control signal inputting terminal of each stage of first touch selection outputting unit 241 and the second control signal inputting terminal of each stage of second touch selection outputting unit 251 are electrically connected with the first control signal line SW. As also known from FIG. 3D and FIG. 4D, a second touch driving electrode does not output the second touch driving signal when the first touch driving circuit outputs the first touch driving signal, and on the contrary, a first touch driving electrode does not output the first touch driving signal when the second touch driving circuit outputs the second touch driving signal.

In embodiments of the disclosure, the number of the stages of first touch selection outputting units 241 may be equal to the number of the stages of second touch selection outputting units 251. In designing the array substrate, each stage of first touch selection outputting unit 241 corresponds to one touch driving electrode and provides a first touch driving signal for the touch driving electrode; and each stage of second touch selection outputting unit 251 corresponds to one touch driving electrode. Since the first touch driving circuit 24 is electrically connected with the first gate driving circuit 232 and the second touch driving circuit 25 is electrically connected with the second gate driving circuit 233, the first touch driving circuit 24 and the second touch driving circuit 25 can implement touch scanning twice in a frame of display scanning, such that the frequency of the touch scanning can be improved, thereby improving touch position reporting rate.

In embodiments of the disclosure, the number of stages of shift registers spaced by two stages of shift registers respectively electrically connected with the two adjacent stages of the first touch selection outputting units 241 is equal to the number of stages of shift registers spaced by two stages of shift registers respectively electrically connected with the two adjacent stages of the second touch selection outputting units 251, which can simplify electrical connection between the touch selection outputting unit and the shift register, thereby reducing design time and improving design efficiency.

Figure 6:
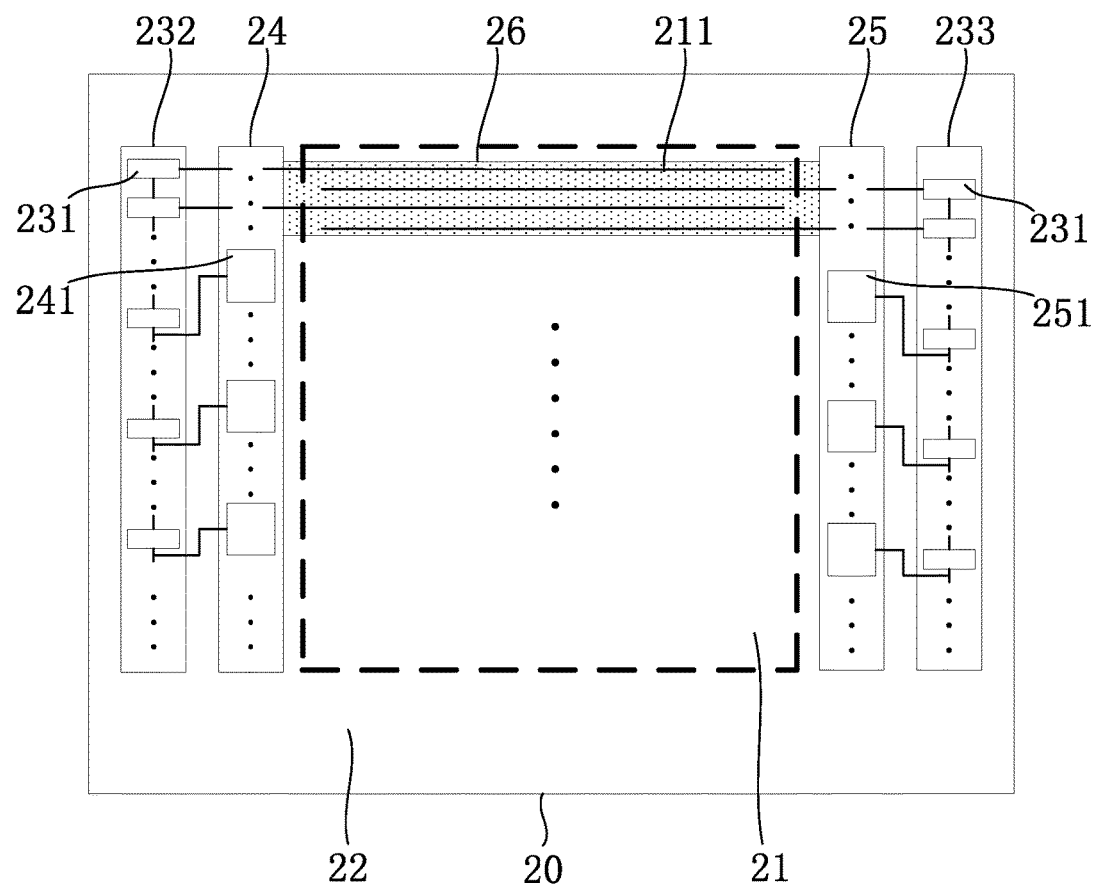
FIG. 6 is a schematic diagram of the structure of an array substrate, according to embodiments of the disclosure.

In embodiments of the disclosure, as shown in FIG. 6, the display region 21 of the array substrate further includes M3 touch driving electrodes 26, where M3 is equal to the larger one of M1 and M2, i.e. M3=Max[M1, M2]; and the stage of first touch selection outputting unit 241 from the first touch driving circuit 24 and the stage of second touch selection outputting unit 251 from the second touch driving circuit 25 which are in the same numbered stage are electrically connected with the same one of the touch driving electrodes 26, i.e., the i-th stage of first touch selection outputting unit 241 from the first touch driving circuit 24 and the i-th stage of second touch selection outputting unit 251 from the second touch driving circuit 25 are electrically connected with the same one of the touch driving electrode 26, where i is an positive integer. With M3=Max[M1, M2], it can be ensured that at least one of both the first touch driving circuit 24 and the second touch driving circuit 25 can provide touch driving signals for all touch driving electrodes 26 to implement touch scanning of the touch driving electrodes 26.

In embodiments of the disclosure, further, the M3 touch driving electrodes 26 are multiplexed as common electrodes. Correspondingly, each touch driving electrode 26 at least covers one row or one column of pixel units along its width direction. If the touch driving electrodes 26 function as common electrodes, the second signal provided by the second signal line TXL in the touch driving circuits is a common voltage signal.

Figure 7:
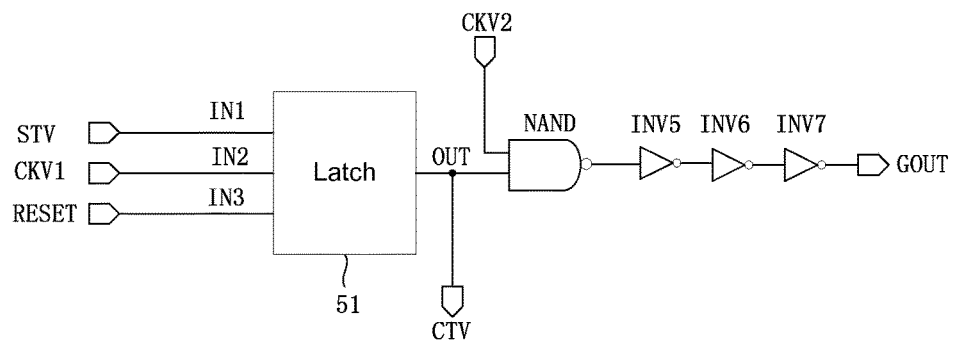
FIG. 7 is a schematic diagram of the structure of a display panel, according to embodiments of the disclosure.

In embodiments of the disclosure, as shown in FIG. 7, for the first gate driving circuit 232 and the second gate driving circuit 233, each stage of shift register can further include: a latch 51, an NAND gate, a fifth inverter INV5, a sixth inverter INV6, a seventh inverter INV7, a first clock signal inputting terminal CKV1, a second clock signal inputting terminal CKV2, a reset signal inputting terminal RESET, and a scanning signal outputting terminal GOUT; a second input terminal IN2 of the latch 51 is electrically connected with the first clock signal inputting terminal CKV1 of the stage of shift register, a first input terminal IN1 of the latch 51 is electrically connected with the trigger signal inputting terminal STV of the stage of shift register, a third input terminal IN3 of the latch 51 is electrically connected with the reset signal inputting terminal RESET of the stage of shift register, and an output terminal OUT of the latch 51 is electrically connected with the secondary trigger signal outputting terminal CTV; and a first input terminal of the NAND gate is electrically connected with the output terminal OUT of the latch; a second input terminal of the NAND gate is electrically connected with the second clock signal inputting terminal CKV2; an output terminal of the NAND gate is electrically connected with an input terminal of the fifth inverter INV5; the fifth inverter INV5, the sixth inverter INV6 and the seventh inverter INV7 are electrically connected in series sequentially; and an output terminal of the seventh inverter INV7 is electrically connected with the scanning signal outputting terminal GOUT.

Figure 8:
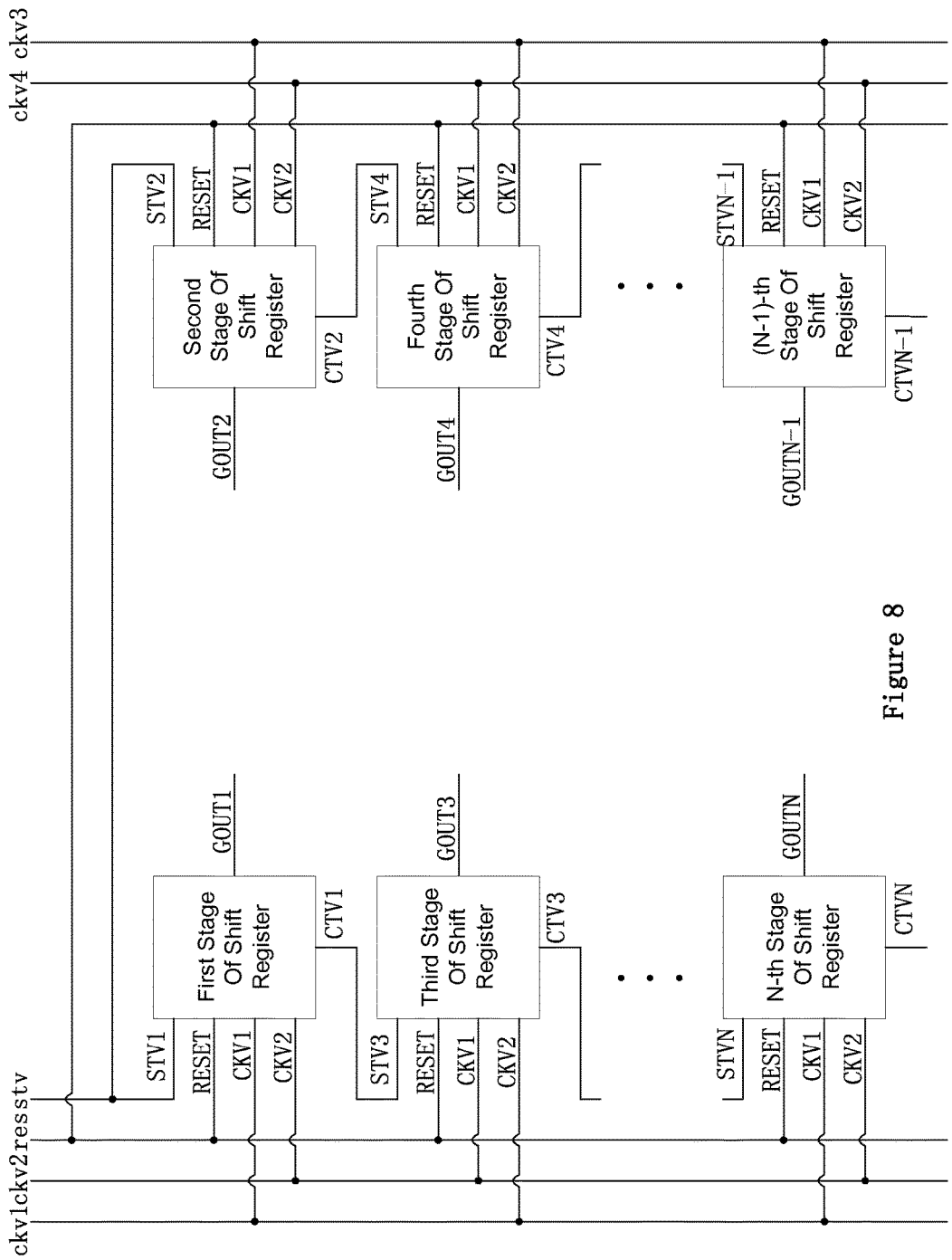
FIG. 8 is a schematic diagram of the structure of a gate controlling unit, according to embodiments of the disclosure.

In embodiments of the disclosure, as shown in FIG. 8, the gate driving circuit can further include a trigger signal line sty and a reset signal line res; the trigger signal inputting terminal of the first shift register from the first gate driving circuit 232 and the trigger signal inputting terminal of the first shift register from the second gate driving circuit 233 (corresponding to the trigger signal inputting terminal STV1 of the first stage of shift register from the first gate driving circuit 232 and the trigger signal inputting terminal STV2 of the second stage of shift register from the second gate driving circuit 233, respectively) are electrically connected with the trigger signal line sty, the reset signal inputting terminal RESET of each stage of shift register from the first gate driving circuit 232 and the reset signal inputting terminal RESET of each stage of shift register from the second gate driving circuit 233 are all electrically connected with the reset signal line res. In FIG. 8, GOUT1 to GOUTN represent the scanning signal outputting terminals of the stages of shift registers; STV1 to STVN represent the trigger signal inputting terminals of the stages of shift registers; and CTV1 to CTVN represent the secondary trigger signal outputting terminals of the stages of shift registers.

In embodiments of the disclosure, as shown in FIG. 8, the first gate driving circuit 232 further includes a first clock signal line ckv1 and a second clock signal line ckv2, where, the first clock signal inputting terminals CKV1 of the stages of shift registers from the first gate driving circuit 232 are alternately electrically connected with the first clock signal line ckv1 and the second clock signal line ckv2, the second clock signal inputting terminals CKV2 of the stages of shift registers from the first gate driving circuit 232 are alternately electrically connected with the first clock signal line ckv1 and the second clock signal line ckv2, and the clock signal line electrically connected with the first clock signal inputting terminal CKV1 of each stage of shift register from the first gate driving circuit 232 is different from the clock signal line electrically connected with the second clock signal inputting terminal CKV2 of the stage of shift register. As shown in FIG. 8, in the first gate driving circuit 232, the first clock signal inputting terminal CKV1 of the first stage of shift register is electrically connected with the first clock signal line ckv1, and the second clock signal inputting terminal CKV2 of the first stage of shift register is electrically connected with the second clock signal line ckv2; the first clock signal inputting terminal CKV1 of the third stage of shift register is electrically connected with the second clock signal line ckv2, and the second clock signal inputting terminal CKV2 of the third stage of shift register is electrically connected with the first clock signal line ckv1. Subsequently, electrical connections between the clock signal inputting terminals of the following stages of shift registers and clock signal lines can refer to the above electrical connections between the clock signal inputting terminals of the first stage of shift register and corresponding clock signal lines and between the clock signal inputting terminals of the third stage of shift register and corresponding clock signal lines, which is not repeated here.

In embodiments of the disclosure, as shown in FIG. 8, the second gate driving circuit 233 further includes a third clock signal line ckv3 and a fourth clock signal line ckv4, where, the first clock signal inputting terminals CKV1 of the stages of shift registers from the second gate driving circuit 233 are alternately electrically connected with the third clock signal line ckv3 and the fourth clock signal line ckv4, the second clock signal inputting terminals CKV2 of the stages of shift registers from the second gate driving circuit 233 are alternately electrically connected with the third clock signal line ckv3 and the fourth clock signal line ckv4, and the clock signal line electrically connected with the first clock signal inputting terminal CKV1 of each stage of shift register from the second gate driving circuit 233 is different from the clock signal line electrically connected with the second clock signal inputting terminal CKV2 of the stage of shift register. As shown in FIG. 8, in the second gate driving circuit 233, the first clock signal inputting terminal CKV1 of the second stage of shift register is electrically connected with the third clock signal line ckv3, and the second clock signal inputting terminal CKV2 of the second stage of shift register is electrically connected with the fourth clock signal line ckv4; the first clock signal inputting terminal CKV1 of the fourth stage of shift register is electrically connected with the fourth clock signal line ckv4, and the second clock signal inputting terminal CKV2 of the fourth stage of shift register is electrically connected with the third clock signal line ckv3. Subsequently, electrical connections between the clock signal inputting terminals of the following stages of shift registers and clock signal lines can refer to the above electrical connections between the clock signal inputting terminals of the first stage of shift register and corresponding clock signal lines and between the clock signal inputting terminals of the third stage of shift register and corresponding clock signal lines, which is not repeated here.

The operating principle of the shift register shown in FIG. 7 and the operating principle of the gate driving circuit shown in FIG. 8 is not repeated here.

Next, the operating principle of electrical connection between the touch driving circuits and the gate driving circuits is further illustrated below, where, the touch driving circuits may be the touch driving circuits shown in FIG. 5, and it is assumed that the number of stages of first touch selection outputting units from the first touch driving circuit 24 is equal to 2, the number of stages of second touch selection outputting units from the second touch driving circuit 25 also is equal to 2; the gate driving circuits may be the gate driving circuits shown in FIG. 8, and the number of stages of shift register from the gate driving circuit is 12.

Figure 9A:
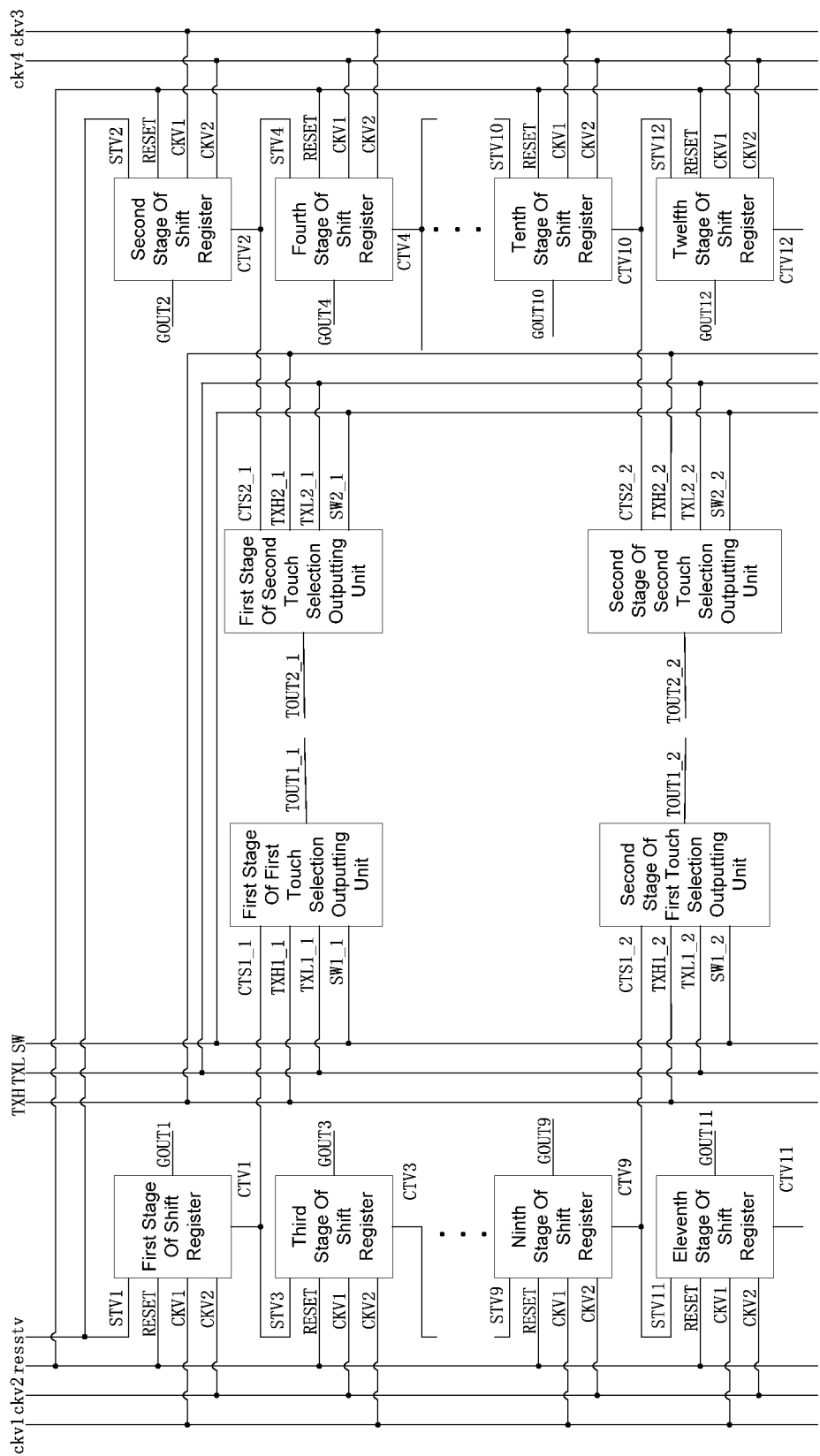
FIG. 9A is a schematic diagram of the structure of a gate controlling unit, according to embodiments of the disclosure.

FIG. 9A is a schematic diagram of a specific embodiment of electrical connection between a gate driving circuit and a touch driving circuit, according to embodiments of the disclosure. As shown in FIG. 9A, the gate driving circuit includes: a first stage of shift register to a twelfth stage of shift register; the first touch driving circuit includes a first stage of first touch selection outputting unit and a second stage of first touch selection outputting unit; the second touch driving circuit includes a first stage of second touch selection outputting unit and a second stage of second touch selection outputting unit, where, a first strobe signal inputting terminal CTS1_1 of the first stage of first touch selection outputting unit is electrically connected with a secondary trigger signal outputting terminal CTV1 of the first stage of shift register, a first strobe signal inputting terminal CTS1_2 of the second stage of first touch selection outputting unit is electrically connected with a secondary trigger signal outputting terminal CTV9 of the ninth stage of shift register, a second strobe signal inputting terminal CTS2_1 of the first stage of second touch selection outputting unit is electrically connected with a secondary trigger signal outputting terminal CTV2 of the second stage of shift register, and a second strobe signal inputting terminal CTS2_2 of the tenth stage of second touch selection outputting unit is electrically connected with a secondary trigger signal outputting terminal CTV10 of the tenth stage of shift register.

Figure 9B:
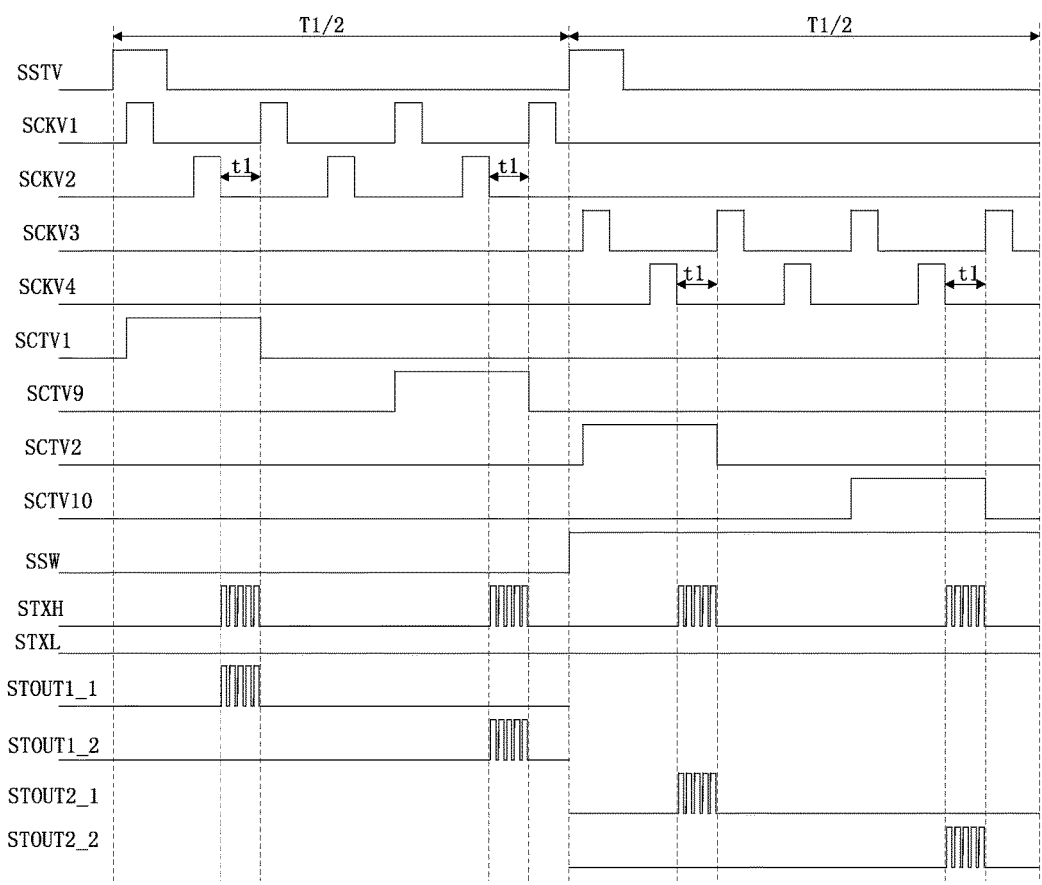
FIG. 9B is a schematic diagram of the structure of a gate controlling unit, according to embodiments of the disclosure.

FIG. 9B is a timing diagram of the input signals of various input terminals and the output signals of various output terminals in FIG. 9A. In FIG. 9B, SSTV represents the trigger signal provided by the trigger signal line sty of the gate driving circuit; SCKV1 represents the first clock signal provided by the first clock signal line ckv1 of the gate driving circuit; SCKV2 represents the second clock signal provided by the second clock signal line ckv2 of the gate driving circuit; SCKV3 represents the third clock signal provided by the third clock signal line ckv3 of the gate driving circuit; SCKV4 represents the fourth clock signal provided by the fourth clock signal line ckv4 of the gate driving circuit; SCTV1 represents the secondary trigger signal generated by the first stage of shift register; SCTV2 represents the secondary trigger signal generated by the second stage of shift register; SCTV9 represents the secondary trigger signal generated by the ninth stage of shift register; SCTV10 represents the secondary trigger signal generated by the tenth stage of shift register; SSW represents the first control signal provided by the first control signal line SW of the touch driving circuit; STXH represents the first signal provided by the first signal line TXH of the touch driving circuit; STXL represents the second signal provided by the second signal line TXL of the touch driving circuit, and the second signal is still a low level signal; STOUT1_1 represents the first touch driving signal outputted from the first stage of first touch selection outputting unit; STOUT1_2 represents the first touch driving signal outputted from the second stage of first touch selection outputting unit; STOUT2_1 represents the second touch driving signal outputted from the first stage of second touch selection outputting unit; and STOUT2_2 represents the second touch driving signal outputted from the second stage of second touch selection outputting unit.

In FIG. 9B, a first T1/2 represents a first half frame of display scanning, the trigger signal SSTV is at a high level within the first half frame of display scanning to trigger the first gate driving circuit, the first clock signal SCKV1 and the second clock signal SCKV2 are alternately at a high level to enable odd stages of shift registers to generate the active scanning signals and the secondary trigger signals (i.e. the scanning signals and secondary trigger signals each having a high level), and the third clock signal SCKV3 and the fourth clock signal SCKV4 are maintained at a low level to enable even stages of shift registers to generate the inactive scanning signal and the secondary trigger signal; and a second T1/2 represents a second half frame of display scanning, the trigger signal SSTV also is at a high level within the second half frame of the display scanning to trigger the second gate driving circuit, the first clock signal SCKV1 and the second clock signal SCKV2 are maintained at a low level to enable odd stages of shift registers to generate the inactive scanning signal and the secondary trigger signal, and the third clock signal SCKV3 and the fourth clock signal SCKV4 both are alternately at a high level to enable even stages of shift registers to generate the active scanning signals and the secondary trigger signals (i.e. the scanning signals and secondary trigger signals each having a high level).

In embodiments of the disclosure, the display scanning and the touch scanning are performed in a time division manner. As shown in FIG. 9B, the first stage of shift register starts to generate a secondary trigger signal having a high level at a first rising edge (i.e. a time when a low level is changed to a high level for the first time) of the first clock signal SCKV1, and stops generating the secondary trigger signal having a high level at a second rising edge of the first clock signal SCKV1; also, the first stage of shift register starts to generate a scanning signal having a high level at a first rising edge of the second clock signal SCKV2 and stops generating the scanning signal having a high level at a first falling edge of the second clock signal SCKV2. Likewise, the third stage of shift register starts to generate a scanning signal having a high level at a second rising edge of the first clock signal SCKV1 and stops generating the scanning signal having a high level at a second falling edge of the first clock signal SCKV1. Since the display scanning and the touch scanning are performed in a time division manner, even though the secondary trigger signal having a high level from the first stage of shift register drives the first stage of first touch selection outputting unit to output the first signal STXH, at this time the first signal STXH is still at a low level. Next, the first signal STXH is change to a pulse signal at the end of a high level of the scanning signal from the first stage of shift register, i.e., at the first falling edge of the second clock signal SCKV2. Subsequently, the first signal STXH is changed back to a low level at the beginning of a high level of the scanning signal from the third stage of shift register, i.e. at the second rising edge of the first clock signal SCKV1. Therefore, a duration for which the first signal STXH is a pulse signal is a time interval between the scanning signals respectively generated by the first stage of shift register and the third stage of shift register, that is, a time interval t1 between the time at the end of the first high level of the second clock signal SCKV2 and the time at the beginning of the second high level of the first clock signal SCKV1. During the time interval t1, the first touch driving signal STOUT1_1 outputted by the first stage of first touch selection outputting unit also is a pulse signal, i.e. an active first touch driving signal, and then during remaining time of the first T1/2 other than the time interval t1, the first touch driving signal STOUT1_1 is a low level signal, i.e. an inactive first touch driving signal. An analysis process of the first touch driving signal STOUT1_2 generated by the second stage of first touch selection output unit, an analysis process of the second touch driving signal STOUT2_1 generated by the first stage of second touch selection output unit and an analysis process of the second touch driving signal STOUT2_2 generated by the second stage of second touch selection outputting unit can refer to the analysis process of the first touch driving signal STOUT1_1 generated by the first stage of first touch selection outputting unit, which is not repeated here.

As shown in FIG. 9B, the first touch driving circuit performs touch scanning once on the touch driving electrodes during the first half frame of display scanning; and the second touch driving circuit performs touch scanning once again on the touch driving electrodes during the second half frame of display scanning. In other words, the frequency of touch scanning is twice as much as the frequency of display scanning. Compared with the case that the frequency of touch scanning is equal to the frequency of display scanning, the technical solutions of the present disclosure improve touch position reporting rate.

Figure 9C:
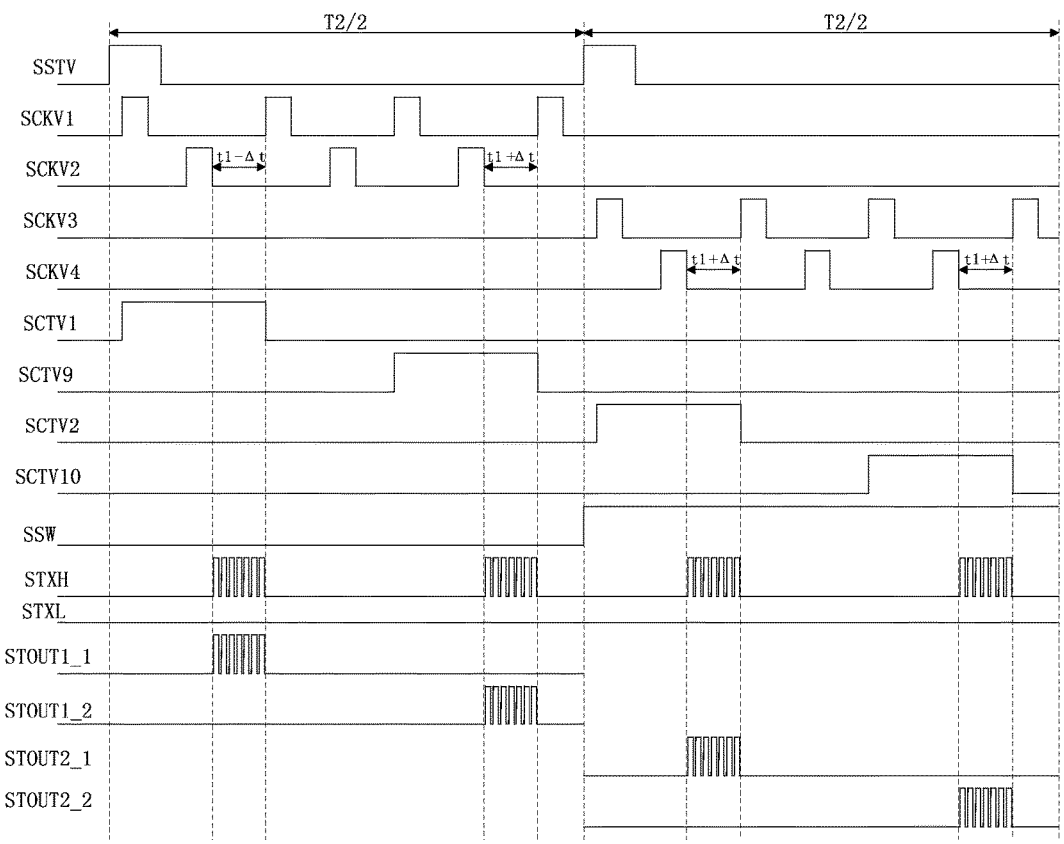
FIG. 9C is a schematic diagram of the structure of a gate controlling unit, according to embodiments of the disclosure.

FIG. 9C is another timing diagram of the input signals of various input terminals and the output signals of various output terminals in FIG. 9A. As shown in FIG. 9C, since the number of pluses contained in a pulse signal of the first signal STXH is increased, the time interval t1 between scanning signals respectively generated by two adjacent stages of shift registers from each gate driving circuit in FIG. 9B cannot meet the duration for which the first signal STXH is a pulse signal in FIG. 9C. Therefore, in FIG. 9C, the time interval between corresponding scanning signals is extended to t1+Δt in order to meet the duration for which the first signal STXH is a pulse signal. In FIG. 9C, the first half frame and the second half frame of display scanning both are T2/2.

Since the number of pulses contained in a pulse signal of the first signal STXH is changed, accordingly the duration for which the first signal STXH is a pulse signal is also changed. Since the pulse signal of the first signal STXH is to be outputted for the time interval between scanning signals respectively of two adjacent stages of shift registers, if original time interval between scanning signals respectively of two adjacent stages of shift registers cannot meet the duration for which the first signal STXH is a pulse signal, then the time interval between scanning signals respectively of two adjacent stages of shift registers needs to be extended to meet the duration for which the first signal STXH is a pulse signal. The corresponding operation can be achieved by the IC's design. After the designs of the gate driving circuit and the touch driving circuit are finished, the electrical connection between the gate driving circuit and the touch driving circuit has been determined, so that the duration for which the first signal STXH is a pulse signal is determined. Therefore, the time interval between scanning signals outputted by two adjacent stages of shift registers can be extended with respect to the duration for which the first signal STXH is a pulse signal.

It is noted that, the number of the pulse signals of the first signal STXH is five in FIG. 9B and the number of the pulse signals of the first signal STXH is seven in FIG. 9C. However, FIGS. 9B and 9C are just two examples of the timing diagram of FIG. 9A, and any number of pulse signals of the first signal STXH can be selected according to actual design and requirements, which is not limited thereto.

Figure 10A:
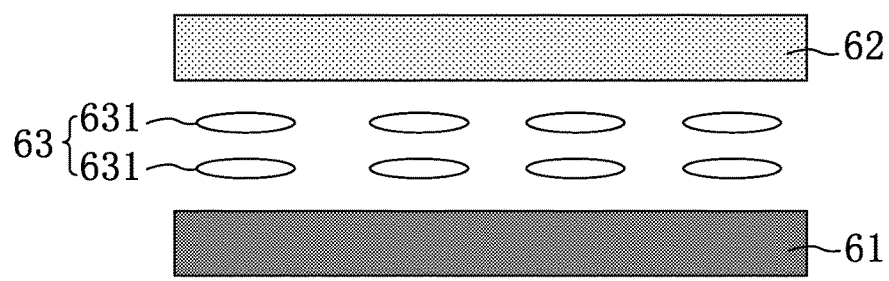
FIG. 10A is a schematic diagram of the structure of a gate controlling unit, according to embodiments of the disclosure.

Embodiment of the disclosure further provide a touch display device. FIG. 10A is a schematic diagram of the structure of a touch display device, according to embodiments of the disclosure. As shown in FIG. 10A, the touch display device includes an array substrate 61, a color filter substrate 62 disposed opposite to the array substrate 61 and a liquid crystal layer 63 between the array substrate 61 and the color filter substrate 62, where, the liquid crystal layer 63 includes a plurality of liquid crystal molecules 631, and the array substrate 61 is the substrate according to the above embodiments.

Figure 10B:
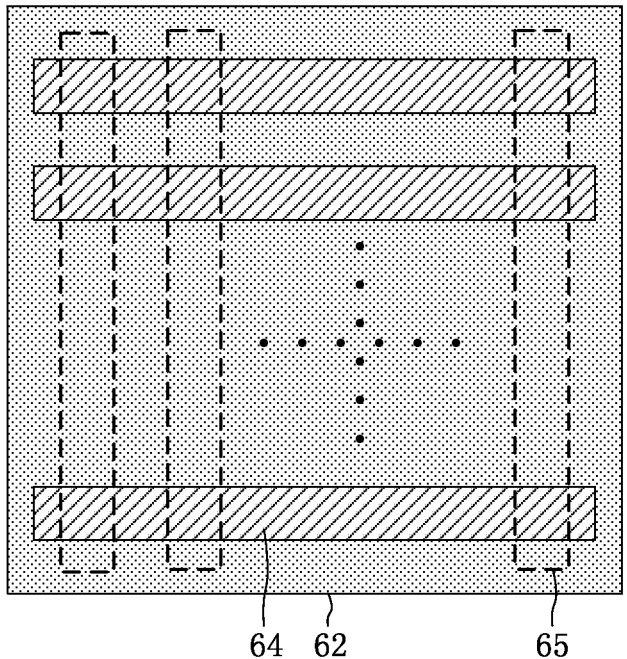
FIG. 10B is a schematic diagram of the structure of a gate controlling unit, according to embodiments of the disclosure.

FIG. 10B is a top view of the touch display device shown in FIG. 10A. As shown in FIG. 10B, the touch display device further includes a plurality of touch sensing electrodes 64 disposed at a side of the color filter substrate 62 away from the liquid crystal layer 63, where, the touch sensing electrodes 64 are disposed across with the touch driving electrodes 65. In addition to the configuration of the touch sensing electrodes shown in FIG. 10B, the touch sensing electrodes may also be disposed at any of film layers on the color filter substrate 62, and may also be disposed at any of film layers on the array substrate 61, where, the touch sensing electrodes may be disposed at the same layer as the touch driving electrodes, or at the different layers from the touch driving electrodes, which is not limited thereto. Additionally, the touch driving electrodes and the touch sensing electrodes each can form a self-capacitance along with ground so as to enable the touch display device to implement the capacitive touch function, or the touch driving electrodes and the touch sensing electrodes can form a mutual capacitance to enable the touch display device to implement the capacitive touch function, which is not limited thereto.

Figure 11:
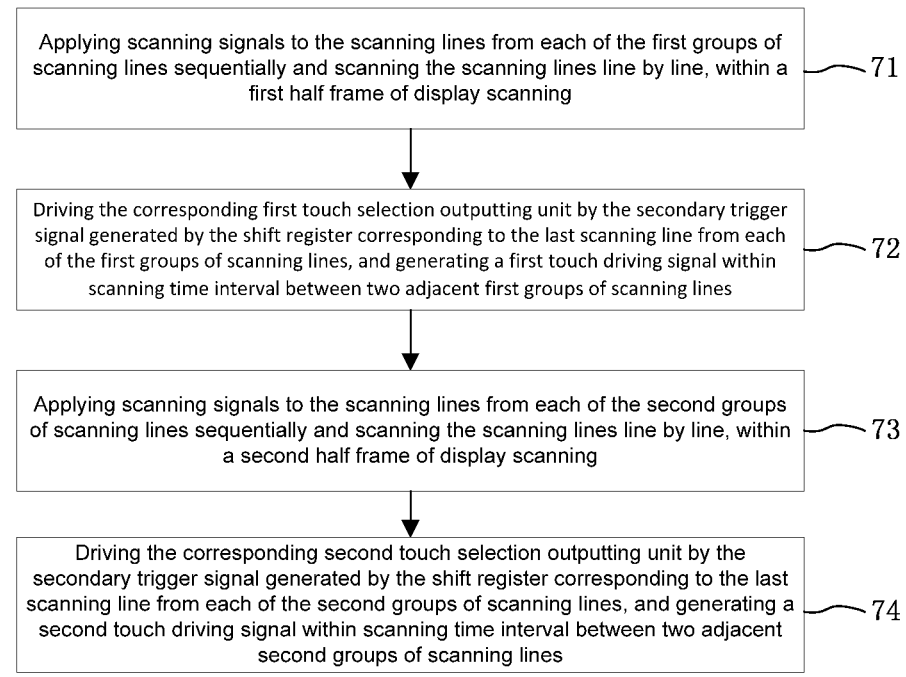
FIG. 11 is a schematic diagram of the structure of a gate controlling unit, according to embodiments of the disclosure.

Embodiments of the disclosure further provide a driving method of the touch display device. The touch display device includes a plurality of first groups of scanning lines, a plurality of second groups of scanning lines, a plurality of stages of shift registers, a plurality of stages of first touch selection outputting units and a plurality of stages of second touch selection outputting units, where, each of the first groups of scanning lines includes a plurality of odd rows of scanning lines, each of the second groups of scanning lines includes a plurality of even rows of scanning lines, each stage of shift register generates a scanning signal for scanning a scanning line and a secondary trigger signal for driving the following stage of shift register, each stage of first touch selection outputting unit is electrically connected with the secondary trigger signal outputting terminal of the shift register corresponding to the last scanning line in each of first groups of scanning lines, and each stage of second touch selection outputting unit is electrically connected with the secondary trigger signal outputting terminal of the shift register corresponding to the last scanning line of each of the second groups of scanning lines. FIG. 11 is a flowchart diagram of a driving method of the touch display device, according to embodiments of the disclosure. As shown in FIG. 11, the driving method includes Steps 71-74 below:

At Step 71: applying scanning signals to the scanning lines from each of the first groups of scanning lines sequentially and scanning the scanning lines line by line, within a first half frame of display scanning;

At Step 72: driving the corresponding first touch selection outputting unit by the secondary trigger signal generated by the shift register corresponding to the last scanning line from each of the first groups of scanning lines, and generating a first touch driving signal within scanning time interval between two adjacent first groups of scanning lines;

At Step 73: applying scanning signals to the scanning lines from each of the second groups of scanning lines sequentially and scanning the scanning lines line by line, within a second half frame of display scanning; and At Step 74: driving the corresponding second touch selection outputting unit by the secondary trigger signal generated by the shift register corresponding to the last scanning line from each of the second groups of scanning lines, and generating a second touch driving signal within scanning time interval between two adjacent second groups of scanning lines.

It is noted that the active first touch driving signal and second touch driving signal are pulse signals, and if the number of the pulses contained therein is changed, the corresponding duration for the pulse signal is also changed. If a scanning time interval between two adjacent scanning lines from each of the first groups of scanning lines can meet the duration for which the first touch driving signal is a pulse signal, then the scanning time interval between two adjacent first groups of scanning lines is equal to the scanning time interval between two adjacent scanning lines from each of the first groups of scanning lines; if the scanning time interval between two adjacent scanning lines from each of the first groups of scanning lines cannot meet the duration for which the first touch driving signal is a pulse signal, then the scanning time interval between two adjacent first groups of scanning lines is needed to be larger than the scanning time interval between two adjacent scanning lines from each of the first groups of scanning lines, and in such case, the scanning time interval between two adjacent groups of scanning lines can be obtained by extending the scanning time interval between two adjacent scanning lines from each of the first groups of scanning lines. Since the generation of the scanning signal is controlled by the IC, if the scanning time interval needs to be extended, it can be extended by configuring the IC. A relation between the scanning time interval between two adjacent scanning lines from each of the second groups of scanning lines and the scanning time interval of two adjacent second groups of scanning lines is similar to the above relation between the scanning time intervals between the first groups of scanning lines, which is not repeatedl here.

With the array substrate, the touch display device and the driving method of the touch display device provided by the embodiments of the disclosure, the gate driving circuits and the touch driving circuits electrically connected with the gate driving circuits are both disposed in the array substrate, and the secondary trigger signals outputted from the shift registers of the gate driving circuit function as the strobe signals of the touch selection outputting units from the touch driving circuits, respectively, and accordingly, the touch driving circuits need not dispose a scanning unit to provide the strobe signals for the touch selection outputting units, such that the touch driving circuits can be rather simple, and not only can easily implement the narrow frame of a touch display device, but also can reduce the number of the output signals of the IC and hence decrease the IC's cost.

It is noted that the embodiments and the applied technology principles of the disclosure are described as above. It should be understood for those skilled in the art that the disclosure is not limited to particular embodiments described herein. Various apparent changes, readjustment and alternative can be made by those skilled in the art without departing from the scope of protection of the disclosure. Therefore, although the disclosure is illustrated through the above embodiments, the disclosure is not limited to the above embodiments, and can further include more of other embodiments without departing from the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An array substrate, comprising: a display region and a peripheral region surrounding the display region, wherein, the display region comprises N rows of scanning lines, N is a positive integer larger than 1, and the peripheral region comprises a gate driving circuit and a touch driving circuit, wherein, the gate driving circuit comprises N stages of shift registers, wherein, the stages of shift registers configured to provide scanning signals for odd rows of scanning lines are electrically connected in series with each other to form a first gate driving circuit and further disposed at one side of the peripheral region, the stages of shift registers configured to provide scanning signals for even rows of scanning lines are electrically connected in series with each other to form a second gate driving circuit and further disposed at the other side of the peripheral region, wherein, each stage of shift register comprises a trigger signal inputting terminal and a secondary trigger signal outputting terminal, and for two adjacent stages of shift registers electrically connected in series from the N stages of shift registers, a secondary trigger signal outputting terminal of the preceding stage of shift register from the two adjacent stages of shift registers is electrically connected with a trigger signal inputting terminal of the next stage of shift register from the two adjacent stages of shift registers;

the touch driving circuit comprises a first touch driving circuit and a second touch driving circuit, wherein, the first touch driving circuit comprises M1 stages of first touch selection outputting units configured to generate first touch driving signals, the second touch driving circuit comprises M2 stages of second touch selection outputting units configured to generate second touch driving signals, M1 and M2 both are positive integers smaller than or equal to [N/2], each stage of first touch selection outputting unit comprises a first strobe signal inputting terminal, and each stage of second touch selection outputting unit comprises a second strobe signal inputting terminal; and the first strobe signal inputting terminals of the stages of first touch selection outputting units from the first touch driving circuit are respectively electrically connected with the secondary trigger signal outputting terminals of the corresponding stages of shift registers from the first gate driving circuit; and the second strobe signal inputting terminals of the stages of second touch selection outputting units from the second touch driving circuit are respectively electrically connected with the secondary trigger signal outputting terminals of the corresponding stages of shift registers from the second gate driving circuit.

2. The array substrate of claim 1, wherein, each stage of first touch selection outputting unit further comprises:

a first buffer subunit, a first signal transmitting subunit, a second signal transmitting subunit and a first control subunit, wherein, the first buffer subunit is configured to buffer the first strobe signal received from the first strobe signal inputting terminal;

the first signal transmitting subunit is configured to transmit a first signal according to the first strobe signal buffered by the first buffer subunit;

the second signal transmitting subunit is configured to transmit a second signal according to the first strobe signal buffered by the first buffer subunit; and the first control subunit is configured to control whether the first signal or the second signal is outputted from the first touch selection outputting unit.

3. The array substrate of claim 2, wherein, the first buffer subunit comprises L1 first inverters comprising the first first inverter to the L1-th first inverter electrically connected in series with each other, an input terminal of the first first inverter is electrically connected with the first strobe signal inputting terminal, and the L1-th first inverter is electrically connected with the first signal transmitting subunit and the second signal transmitting subunit, wherein, L1 is a positive integer;

the first signal transmitting subunit comprises a first NMOS transistor, a first PMOS transistor and a first signal inputting terminal, wherein, if L1 is an odd number, a gate electrode of the first NMOS transistor is electrically connected with an input terminal of the L1-th first inverter, and a gate electrode of the first PMOS transistor is electrically connected with an output terminal of the L1-th first inverter; if L1 is an even number, a gate electrode of the first PMOS transistor is electrically connected with an input terminal of the L1-th first inverter, and a gate electrode of the first NMOS transistor is electrically connected with an output terminal of the L1-th first inverter; a source electrode of the first NMOS transistor and a drain electrode of the first PMOS transistor are electrically connected with each other and further electrically connected with the first signal inputting terminal, and a drain electrode of the first NMOS transistor and a source electrode of the first PMOS transistor are electrically connected with each other and further electrically connected with the first control subunit;

the second signal transmitting subunit comprises a second NMOS transistor, a second PMOS transistor and a second signal inputting terminal, wherein, if L1 is an odd number, a gate electrode of the second PMOS transistor is electrically connected with an input terminal of the L1-th first inverter, and a gate electrode of the second NMOS transistor is electrically connected with an output terminal of the L1-th first inverter; if L1 is an even number, a gate electrode of the second NMOS transistor is electrically connected with an input terminal of the L1-th first inverter, and a gate electrode of the second PMOS transistor is electrically connected with an output terminal of the L1-th first inverter; a source electrode of the second NMOS transistor and a drain electrode of the second PMOS are electrically connected with each other and further electrically connected with the second signal inputting terminal, and a drain electrode of the second NMOS transistor and a source electrode of the second PMOS transistor are electrically connected with each other and further electrically connected with the first control subunit; and the first control subunit comprises: a second inverter, a third NMOS transistor, a third PMOS transistor, a first control signal inputting terminal and a first touch driving signal outputting terminal, wherein, an input terminal of the second inverter is electrically connected with the first control signal inputting terminal and a gate electrode of the third PMOS transistor, respectively, an output terminal of the second inverter is electrically connected with a gate electrode of the third NMOS transistor, a source electrode of the third NMOS transistor and a drain electrode of the third PMOS transistor are electrically connected with each other and further electrically connected with the drain electrode of the first NMOS transistor and the drain electrode of the second NMOS transistor, and a drain electrode of the third NMOS transistor and a source electrode of the third PMOS transistor are electrically connected with each other and further electrically connected with the first touch driving signal outputting terminal.

4. The array substrate of claim 3, wherein, each stage of second touch selection outputting unit comprises:

a second buffer subunit, a third signal transmitting subunit, a fourth signal transmitting subunit and a second control subunit, wherein, the second buffer subunit is configured to buffer second strobe signal received from the second strobe signal inputting terminal;

the third signal transmitting subunit is configured to transmit a third signal according to the second strobe signal buffered by the second buffer subunit;

the fourth signal transmitting subunit is configured to transmit a fourth signal according to the second strobe signal buffered by the second buffer subunit; and the second control subunit is configured to control whether the third signal or the fourth signal is outputted from the second touch selection outputting unit.

5. The array substrate of claim 4, wherein, the second buffer subunit comprises L2 third inverters comprising the first third inverter to the L2-th third inverter electrically connected in series with each other, an input terminal of the first third inverter is electrically connected with the second strobe signal inputting terminal, and the L1-th third inverter is electrically connected with the third signal transmitting subunit and the fourth signal transmitting subunit, wherein, L2 is a positive integer;

the third signal transmitting subunit comprises a fourth NMOS transistor, a fourth PMOS transistor and a third signal inputting terminal, wherein, if L2 is an odd number, a gate electrode of the fourth NMOS transistor is electrically connected with an input terminal of the L2-th third inverter, and a gate electrode of the fourth PMOS transistor is electrically connected with an output terminal of the L2-th third inverter; if L2 is an even number, a gate electrode of the fourth PMOS transistor is electrically connected with an input terminal of the L2-th third inverter, and a gate electrode of the fourth NMOS transistor is electrically connected with an output terminal of the L2-th third inverter; a source electrode of the fourth NMOS transistor and a drain electrode of the fourth PMOS transistor are electrically connected with each other and further connected with the third signal inputting terminal, and a drain electrode of the fourth NMOS transistor and a source electrode of the fourth PMOS transistor are electrically connected with each other and further electrically connected with the second control subunit;

the fourth signal transmitting subunit comprises a fifth NMOS transistor, a fifth PMOS transistor and a fourth signal inputting terminal, wherein, if L2 is an odd number, a gate electrode of the fifth PMOS transistor is electrically connected with an input terminal of the L2-th third inverter, and a gate electrode of the fifth NMOS transistor is electrically connected with an output terminal of the L2-th third inverter; if L2 is an even number, the gate electrode of the fifth NMOS transistor is electrically connected with the input terminal of the L2-th third inverter, and the gate electrode of the fifth PMOS transistor is electrically connected with the output terminal of the L2-th third inverter; a source electrode of the fifth NMOS transistor and a drain electrode of the fifth PMOS are electrically connected with each other and further electrically connected with the fourth signal inputting terminal, and a drain electrode of the fifth NMOS transistor and a source electrode of the fifth PMOS transistor are electrically connected with each other and further electrically connected with the second control subunit;

the second control subunit comprises: a fourth inverter, a sixth NMOS transistor, a sixth PMOS transistor, a second control signal inputting terminal and a second touch driving signal outputting terminal, wherein, an input terminal of the fourth inverter is electrically connected with the second control signal inputting terminal and a gate electrode of the sixth NMOS transistor, respectively, an output terminal of the fourth inverter is electrically connected with a gate electrode of the sixth PMOS transistor, a source electrode of the sixth NMOS transistor and a drain electrode of the sixth PMOS transistor are electrically connected with each other and further electrically connected with the drain electrode of the fourth NMOS transistor and the drain electrode of the fifth NMOS transistor, and a drain electrode of the sixth NMOS transistor and a source electrode of the sixth PMOS transistor are electrically connected with each other and further electrically connected with the second touch driving signal outputting terminal.

6. The array substrate of claim 5, wherein, the touch driving circuit further comprises:

a first signal line, a second signal line and a first control signal line; and a first signal inputting terminal of each stage of first touch selection outputting unit and a third signal inputting terminal of each stage of second touch selection outputting unit are electrically connected with the first signal line, a second signal inputting terminal of each stage of first touch selection outputting unit and a fourth signal inputting terminal of each stage of second touch selection outputting unit are electrically connected with the second signal line, and a first control signal inputting terminal of each stage of first touch selection outputting unit and a second control signal inputting terminal of each stage of second touch selection outputting units are electrically connected with the first control signal line.

7. The array substrate of claim 1, wherein, the number of stages of the first touch selection outputting units is equal to the number of stages of the second touch selection outputting units.

8. The array substrate of claim 7, wherein, the number of stages of shift registers spaced by two stages of shift registers respectively electrically connected with the two adjacent stages of the first touch selection outputting units is equal to the number of stages of shift registers spaced by two stages of shift registers respectively electrically connected with the two adjacent stages of the second touch selection outputting units.

9. The array substrate of claim 1, wherein, the display region of the array substrate further comprises M3 touch driving electrodes, where M3=Max[M1, M2]; and
a stage of first touch selection outputting unit from the first touch driving circuit and a stage of second touch selection outputting unit from the second touch driving circuit which are in the same numbered stage are electrically connected with the same one of the touch driving electrodes.

10. The array substrate of claim 9, wherein, the M3 touch driving electrodes are multiplexed as common electrodes.

11. The array substrate of claim 1, wherein, each stage of shift register further comprises: a latch, an NAND gate, a fifth inverter, a sixth inverter, a seventh inverter, a first clock signal inputting terminal, a second clock signal inputting terminal, a reset signal inputting terminal, and a scanning signal outputting terminal;
a first input terminal of the latch is electrically connected with the first clock signal inputting terminal of the stage of shift register, a second input terminal of the latch is electrically connected with the trigger signal inputting terminal of the stage of shift register, a third input terminal of the latch is electrically connected with the reset signal inputting terminal of the stage of shift register, and an output terminal of the latch is electrically connected with the secondary trigger signal outputting terminal; and
a first input terminal of the NAND gate is electrically connected with the output terminal of the latch; a second input terminal of the NAND gate is electrically connected with the second clock signal inputting terminal; an output terminal of the NAND gate is electrically connected with an input terminal of the fifth inverter; the fifth inverter, the sixth inverter and the seventh inverter are electrically connected in series sequentially; and an output terminal of the seventh inverter is electrically connected with the scanning signal outputting terminal.

12. The array substrate of claim 11, wherein, the gate driving circuit further comprises a trigger signal line and a reset signal line; and
the trigger signal inputting terminal of the first shift register from the first gate driving circuit and the trigger signal inputting terminal of the first shift register from the second gate driving circuit are electrically connected with the trigger signal line, and the reset signal inputting terminal of each stage of shift register from the first gate driving circuit and the reset signal inputting terminal of each stage of shift register from the second gate driving circuit are all electrically connected with the reset signal line.

13. The array substrate of claim 12, wherein, the first gate driving circuit further comprises a first clock signal line and a second clock signal line, wherein, the first clock signal inputting terminals of the stages of shift registers from the first gate driving circuit are alternately electrically connected with the first clock signal line and the second clock signal line, the second clock signal inputting terminals of the stages of shift registers from the first gate driving circuit are alternately electrically connected with the first clock signal line and the second clock signal line, and the clock signal line electrically connected with the first clock signal inputting terminal of each stage of shift register from the first gate driving circuit is different from the clock signal line electrically connected with the second clock signal inputting terminal of the stage of shift register.

14. The array substrate of claim 12, wherein, the second gate driving circuit further comprises a third clock signal line and a fourth clock signal line, wherein, the first clock signal inputting terminals of the stages of shift registers from the second gate driving circuit are alternately electrically connected with the third clock signal line and the fourth clock signal line, the second clock signal inputting terminals of the stages of shift registers from the second gate driving circuit are alternately electrically connected with the third clock signal line and the fourth clock signal line, and the clock signal line electrically connected with the first clock signal inputting terminal of each stage of shift register from the second gate driving circuit is different from the clock signal line electrically connected with the second clock signal inputting terminal of the stage of shift register.

15. A touch display device, comprising an array substrate, a color filter substrate disposed opposite to the array substrate and a liquid crystal layer between the array substrate and the color filter substrate, wherein, the array substrate is the array substrate of claim 1.

16. The touch display device of claim 15, wherein the touch display device further comprises a plurality of touch sensing electrodes disposed at a side of the color filter substrate away from the liquid crystal layer, wherein, the touch sensing electrodes are disposed across with the touch driving electrodes.

17. A driving method of the touch display device, the touch display device comprises a plurality of first groups of scanning lines, a plurality of second groups of scanning lines, a plurality of stages of shift registers, a plurality of stages of first touch selection outputting units and a plurality of stages of second touch selection outputting units, wherein, each of the first groups of scanning lines comprises a plurality of odd rows of scanning lines, each of the second groups of scanning lines comprises a plurality of even rows of scanning lines, each stage of shift register generates a scanning signal for scanning a scanning line and a secondary trigger signal for driving the following stage of shift register, each stage of first touch selection outputting unit is electrically connected with the secondary trigger signal outputting terminal of the shift register corresponding to the last scanning line of each of first groups of scanning lines, and each stage of second touch selection outputting unit is electrically connected with the secondary trigger signal outputting terminal of the shift register corresponding to the last scanning line of each of the second groups of scanning lines, wherein, the driving method comprises:
applying scanning signals to the scanning lines from each of the first groups of scanning lines sequentially and scanning the scanning lines line by line within a first half frame of display scanning;
driving the corresponding first touch selection outputting unit by the secondary trigger signal generated by the shift register corresponding to the last scanning line from each of the first groups of scanning lines, and
generating a first touch driving signal within scanning time interval between two adjacent first groups of scanning lines;
applying scanning signals to the scanning lines from each of the second groups of scanning lines sequentially and scanning the scanning lines line by line within a second half frame of display scanning; and driving the corresponding second touch selection outputting unit by the secondary trigger signal generated by the shift register corresponding to the last scanning line from each of the second groups of scanning lines, and generating a second touch driving signal within scanning time interval between two adjacent second groups of scanning lines.

* * * * *